United States Patent [19]

Reps et al.

[11] Patent Number: 5,161,216
[45] Date of Patent: Nov. 3, 1992

[54] INTERPROCEDURAL SLICING OF COMPUTER PROGRAMS USING DEPENDENCE GRAPHS

[75] Inventors: Thomas Reps; Susan Horwitz; David Binkley, all of Madison, Wis.

[73] Assignee: Wisconsin Alumni Research Foundation, Madison, Wis.

[21] Appl. No.: 324,321

[22] Filed: Mar. 8, 1989

[51] Int. Cl.$^5$ ............................................. G06F 9/45
[52] U.S. Cl. ................................. 395/375; 364/280.4; 364/280.5; 364/262.4; 364/280; 364/DIG. 1; 395/650
[58] Field of Search ... 364/200 MS File, 900 MS File; 395/375, 650

[56] References Cited

U.S. PATENT DOCUMENTS

| | | | |
|---|---|---|---|
| 3,710,348 | 1/1973 | Craft | 364/900 |
| 4,502,118 | 2/1985 | Hagenmaier | 364/200 |
| 4,654,780 | 3/1987 | Logsdon | 364/200 |
| 4,734,848 | 3/1988 | Yamano | 364/300 |
| 4,734,854 | 3/1988 | Afshar | 364/200 |

OTHER PUBLICATIONS

Ferrante et al., "The Program Dependence Graph and Its Use in Optimization", ACM Transactions on Programming Languages and Systems, vol. 9, No. 3, Jul. 1987.
Kastens, "Ordered Attributed Grammers", *Acta Informatica*, vol. 13, No. 3 1980 pp. 229-256.
Banning, "An Efficient Way to Find the Side Effect of Procedure Calls and the Alies of Variables," Conference Record of the Sixth ACM Symposium on Principles of Programming Languages, San Antonio, Texas, Jan. 29-31, 1979, pp. 29-41.
Cooper, et al., "Interprocedural Side Effect Analysis in Linear Time," Proceedings of the ADM SIGPLAN 88 Conference on Programming Language Design and Implementation, Atlanta, Georgia, Jun. 22-24, 1988, pp. 27-66.
Ferrante et al., "The Program Dependence Graph and Its Use in Optimization," *ACM Transactions on Programming Languages and Systems*, vol. 9, No. 3, Jul. 1987, pp. 319-349.
Horowitz, et al., "Intergrated Non-Interfering Versions of Programs," Computer Sciences Technical Report No. 690, Computer Sciences Department, University of Wisconsin, Madison, Wisconsin, Mar. 1987.

(List continued on next page.)

*Primary Examiner*—Thomas C. Lee
*Assistant Examiner*—Eric Coleman
*Attorney, Agent, or Firm*—Foley & Lardner

[57] ABSTRACT

Programs having multiple procedures are analyzed by creating a system dependence graph which includes a program dependence graph representing the main program, procedure dependence graphs for each of the auxiliary procedures, and additional edges that represent direct dependencies between a call site and a called procedure and edges that represent transitive dependencies due to calls. These edges are constructed with the aid of an auxiliary structure that represents calling and parameter linkage relationships. This structure takes the form of an attribute grammar. The step of computing the required transitive-dependence edges is reduced to the construction of the subordinate characteristic graphs for the grammar's nonterminals. A slide of a program with respect to a program point p and a variable X consists of all statements of the program that might affect the value of X at point p. The system dependence graph is used in an algorithm to carry out interprocedural slicing, the generating of a slice of an entire program where the slice crosses the boundaries of procedure calls.

1 Claim, 17 Drawing Sheets

Microfiche Appendix Included
(3 Microfiche, 123 Pages)

OTHER PUBLICATIONS

Horowitz, et al., "Integrated Non-Interfering Versions of Programs," Conference Record of the 15th ACM Symposium of Principles of Programming Languages, San Diego, California, Jan. 13–15, 1988, pp. 133–145.

Hwang, et al., "Finding Program Slices for Recursive Procedures," Proceedings of the IEEE COMPSAC 88, Chicago, Illinois, Oct. 3–7, 1988.

Kastens, "Ordered Atributed Grammers," *Acta Informatica*, vol. 13, No. 3, 1980, pp. 229–256.

Kuck, et al., "Dependence Graphs and Compiler Optimizations," Conference Record of the 8th ACM Symposium on Principles of Programming Languages, Williamsburg, Virginia, Jan. 26–28, 1981, pp. 207–218.

Ottenstein, et al., "The Program Dependence Graph in a Software Development Environments", Pittsburg, Pennsylvania, Apr. 23–25, 1984, *ADCM SIGPLAN Notices*, vol. 19, No. 5, May 1984, pp. 177–184.

Reps, et al., "The Semantics of Program Slicing," Computer Sciences Technical Report No. 177, Computer Sciences Department, University of Wisconsin, Madison Wisconsin, Jun. 1988.

Weiser, "Program Slicing," *IEEE Transactions on Software Engineering*, vol. SE-10, No. 4, Jul. 1984, pp. 352–357.

Horwitz, et al., "Interprocedural Slicing Using Dependence Graphs," *Computer Sciences Technical Report #756*, University of Wisconsin–Madison, Mar., 1988.

Horwitz, et al., "Interprocedural Slicing Using Dependence Graphs," Proc. of the SIGPLAN '88 Conf. on Programming Language Design and Implementation, Atlanta, Georgia, Jun. 22–24, 1988.

Reps, et al., "Semantics, Based Program Integration," Proc. of the 2nd European Symposium on Programming (ESOP '88), Nancy, France, Mar. 21–24, 1988, also Lecture Notes in Computer Science, vol. 300, pp. 1–20.

Reps, "Demonstration of a Prototype Tool for Program Integration," *Computer Sciences Technical Report #819*, University of Wisconsin–Madison, Jan., 1989.

Exhibit A: 23 pages constituting copies of slides.

Exhibit B: 3 pages listing attendees at Industrial Affiliates Meeting dated Dec. 1–2, 1987.

```
program Main
    sum := 0;
    i := 1;
    while i < 11 do
        sum := sum+i;
        i := i+1
    od
end(sum, i)
```

```
procedure MarkVerticesOfSlice(G, S)
declare
    G: a program dependence graph
    S: a set of vertices in G
    WorkList: a set of vertices in G
    v, w: vertices in G
begin
    WorkList := S
    while WorkList ≠ ∅ do
        Select and remove vertex v from WorkList
        Mark v
        for each vertex w such that edge w →_f v or edge w →_c v is in E(G) do
            if w is unmarked then Insert w into WorkList fi
        od
    od
end
```

Figure 2.

```
program Main
  i := 1;
  while i < 11 do
    i := i + 1
  od
end(i)
```

```
procedure ConstructSubCGraphs(L)
declare
    L: a linkage grammar
    p: a production in L
    $X_i, X_j, \hat{X}$: nonterminal occurrences in L
    a, b: attributes of nonterminals in L
    X: a nonterminal in L
begin
    /* Step 1: Initialize the TDS and TDP graphs */
        for each nonterminal X in L do
            TDS(X) := the graph containing a vertex for each attribute X.b but no edges
        od
        for each production p in L do
            TDP(p) := the graph containing a vertex for each attribute occurrence $X_j$.b of p but no edges
            for each attribute occurrence $X_j$.b of p do
                for each argument $X_i$.a of $X_j$.b do
                    Insert edge ($X_i$.a, $X_j$.b) into TDP(p)
                    let X be the nonterminal corresponding to nonterminal occurrence $X_j$ in
                        if i = 0 and j = 0 and (X.a, X.b) ∉ TDS(X)
                            then Insert an unmarked edge (X.a, X.b) into TDS(X)
                        fi
                ni
                od
            od
        od
    /* Step 2: Determine the sets of induced transitive dependences */
        while there is an unmarked edge (X.a, X.b) in one of the TDS graphs do
            Mark (X.a, X.b)
            for each occurrence $\hat{X}$ of X in any production p do
                if ($\hat{X}$.a, $\hat{X}$.b) ∉ TDP(p) then AddEdgeAndInduce(TDP(p), ($\hat{X}$.a, $\hat{X}$.b)) fi
            od
        od
end
```

Figure 7.

```
procedure MarkVerticesOfSlice(G, S)
declare
    G: a system dependence graph
    S, S': sets of vertices in G
begin
    /* Phase 1: Slice without descending into called procedures */
        MarkReachingVertices(G, S, {def-order, linkage-exit})

/* Phase 2: Slice called procedures without ascending to call sites */
        S' := all marked vertices in G
        MarkReachingVertices(G, S', {def-order, linkage-entry, call})
end procedure MarkReachingVertices(G, V, Kinds)
declare
    G: a system dependence graph
    V: a set of vertices in G
    Kinds: a set of kinds of edges
    v, w: vertices in G
    WorkList: a set of vertices in G
begin
    WorkList := V
    while WorkList ≠ ∅ do
        Select and remove a vertex v from WorkList
        Mark v
        for each unmarked vertex w that is a predecessor of v in G
            such that there is an edge w → v whose kind is not in Kinds do
            Insert w into WorkList
        od
    od
end
```

Figure 9.

*attributes*
   $S.flowEdgesWithTargetsSubordinate$:    synthesized
   $S.flowEdges$:    inherited
   $S.flowEdgesWithSourcesSubordinate$:    synthesized
   $S.flowEdgesBefore$:    inherited
   $S.flowEdgesAfter$:    synthesized

*attribute equations*
   $Root \rightarrow S$
      $S.flowEdgesBefore = S.flowEdgesWithTargetsSubordinate$
      $S.flowEdges = S.flowEdgesWithTargetsSubordinate$ $S \rightarrow Id := Exp$
      $S.flowEdgesWithTargetsSubordinate = \{ <a, \&S> \mid <i, a, l> \in S.reachingDefsBefore \land i \in Exp.used \}$
      $S.flowEdgesWithSourcesSubordinate = \{ <s, t> \mid <s, t> \in S.flowEdges \land s = \&S \}$
      $S.flowEdgesAfter = S.flowEdgesBefore - \{ <s, t> \mid <s, t> \in S.flowEdgesBefore \land s = \&S \}$ $S_1 \rightarrow S_2 ; S_3$
      $S_1.flowEdgesWithTargetsSubordinate = S_2.flowEdgesWithTargetsSubordinate$
           $\cup\ S_3.flowEdgesWithTargetsSubordinate$
      $S_2.flowEdges = S_1.flowEdges$
      $S_3.flowEdges = S_1.flowEdges$
      $S_1.flowEdgesWithSourcesSubordinate = S_2.flowEdgesWithSourcesSubordinate$
           $\cup\ S_3.flowEdgesWithSourcesSubordinate$
      $S_2.flowEdgesBefore = S_1.flowEdgesBefore$
      $S_3.flowEdgesBefore = S_2.flowEdgesAfter$
      $S_1.flowEdgesAfter = S_3.flowEdgesAfter$ $S_1 \rightarrow$ if $Exp$ then $S_2$ else $S_3$ fi
      $S_1.flowEdgesWithTargetsSubordinate = \{ <a, \&S_1> \mid <i, a, l> \in S_1.reachingDefsBefore \land i \in Exp.used \}$
           $\cup\ S_2.flowEdgesWithTargetsSubordinate \cup S_3.flowEdgesWithTargetsSubordinate$
      $S_2.flowEdges = S_1.flowEdges$
      $S_3.flowEdges = S_1.flowEdges$
      $S_1.flowEdgesWithSourcesSubordinate = S_2.flowEdgesWithSourcesSubordinate$
           $\cup\ S_3.flowEdgesWithSourcesSubordinate$
      $S_2.flowEdgesBefore = S_1.flowEdgesBefore - S_3.flowEdgesWithSourcesSubordinate$
      $S_3.flowEdgesBefore = S_1.flowEdgesBefore - S_2.flowEdgesWithSourcesSubordinate$
      $S_1.flowEdgesAfter = S_1.flowEdgesBefore - S_2.flowEdgesWithSourcesSubordinate$
           $-\ S_3.flowEdgesWithSourcesSubordinate$ $S_1 \rightarrow$ while $Exp$ do $S_2$ od
      $S_1.flowEdgesWithTargetsSubordinate = \{ <a, \&S_1> \mid <i, a, l> \in S_1.reachingDefsBefore \land i \in Exp.used \}$
           $\cup\ S_2.flowEdgesWithTargetsSubordinate$
      $S_2.flowEdges = S_1.flowEdges$
      $S_1.flowEdgesWithSourcesSubordinate = S_2.flowEdgesWithSourcesSubordinate$
      $S_2.flowEdgesBefore = S_1.flowEdgesBefore$
      $S_1.flowEdgesAfter = S_2.flowEdgesAfter$

Figure 15.

INTERPROCEDURAL SLICING OF COMPUTER PROGRAMS USING DEPENDENCE GRAPHS

This invention was made with U.S. Government support awarded by the National Science Foundation (NSF), Grant #DCR-8603356 and PYI Award #DCR-8552602. The U.S. Government has certain rights in this invention.

This application includes a microfiche appendix listing of a computer program having 123 frames. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention pertains generally to the field of computer systems and programming and particularly to procedures for analyzing program structures.

BACKGROUND OF THE INVENTION

The slice of a program with respect to program point p and variable x consists of all statements and predicates of the program that might affect the value of x at point p. The value x at program point p is directly affected by assignments to x that reach p and by the loops and conditionals that enclose p. An intraprocedural slice (i.e., the slice of a single procedure) can be determined from the closure of the directly-affects relation.

Program slicing, originally defined in Weiser, M., "Program Slicing," IEEE Transactions on Software Engineering SE-10(4) pp. 352-357 (July 1984), can be used to isolate individual computation threads within a program, which can help a programmer understand complicated code. Program slicing is also used by the algorithm for automatically integrating program variants described in Horwitz, S., Prins. J., and Reps, T., "Integrating non-interfering versions of programs," pp. 133-145 in Conference Record of the Fifteenth ACM Symposium on Principles of Programming Languages, (San Diego, CA, January 13-15, 1988), ACM, New York, NY (1988); slices are used to compute a safe approximation to the change in behavior between a program P and a modified version of P, and to help determine whether two different modifications to P interfere.

In Weiser's terminology, a slicing criterion is a pair <p,V>, where p is a program point and V is a subset of the program's variables. In his work, a slice consists of all statements and predicates of the program that might affect the value of variables in V at point p. This is a more general kind of slice than is often needed: rather than a slice taken with respect to program point p and an arbitrary variable, one is often interested in a slice taken with respect to a variable that is defined at or used at p. Ottenstein and Ottenstein point out how well-suited program dependence graphs are for this kind of slicing and propose that program dependence graphs be used to represent procedures in software development environments. Ottenstein, K.J. and Ottenstein, L.M., "The program dependence graph in a software development environment," Proceedings of the ACM SIGSOFT/SIGPLAN Software Engineering Symposium on Practical Software Development Environments, (Pittsburgh, PA, Apr. 23-25, 1984), ACM SIGPLAN Notices 19(5) pp. 177-184 (May 1984).

SUMMARY OF THE INVENTION

The present invention concerns the problem of interprocedural slicing—generating a slice of an entire program, where the slice crosses the boundaries of procedure calls. The procedure of the invention for interprocedural slicing produces a more precise interprocedural slice than the one given in Weiser supra, The invention follows the example of Ottenstein, supra, by defining the slicing algorithm in terms of operations on a dependence graph representation of programs; however, Ottenstein only discusses programs consisting of a single monolithic procedure, and does not address the problem of slicing across procedure boundaries.

To solve the interprocedural-slicing problem, a new kind of graph to represent programs is provided, called a system dependence graph, which extends previous dependence representations to incorporate collections of procedures (with procedure calls) rather than just monolithic programs. A new algorithm is presented which can be used by a computer to generate the system dependence graph. The new representation is utilized to provide an improved procedure for interprocedural slicing.

Further objects, features and advantages of the invention will be apparent from the following detailed description taken in conjunction with the accompanying drawings.

BRIEF DESCRIPTION OF THE DRAWINGS

In the drawings:

FIG. 2 is a worklist algorithm that marks the vertices in G/S.

FIG. 7 is a procedure for the computation of a linkage grammar's sets of TDP and TDS graphs.

FIG. 9 is a procedure, entitled MarkVerticesOfSlice, which mark vertices of the interprocedural slice G/S.

FIG. 15 is an attribute grammar that describes the generation of a program's def-order dependence edges.

DETAILED DESCRIPTION OF THE INVENTION

Figure 1:
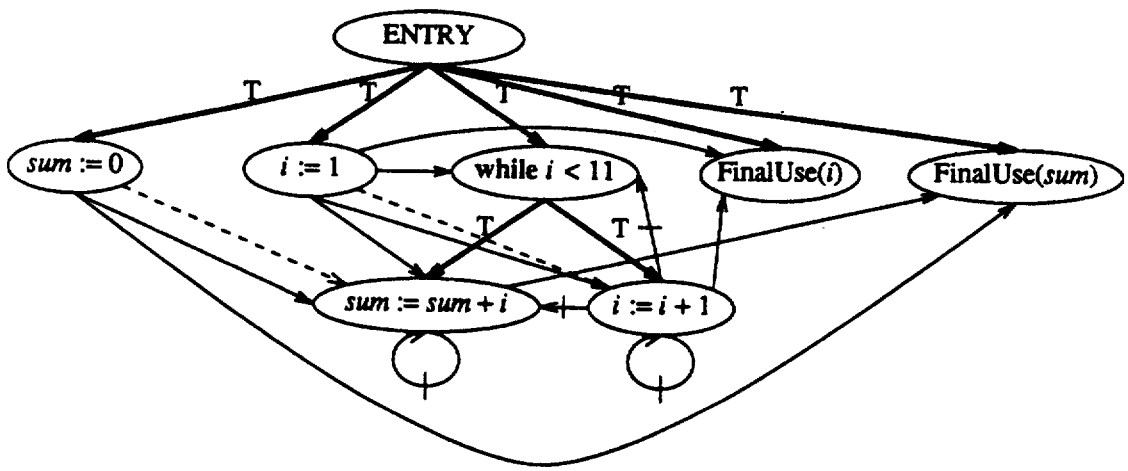
FIG. 1 is a program dependence graph for an example program which sums the integers from 1 to 10 and leaves the result in the variable sum.

The chief difficulty in interprocedural slicing is correctly accounting for the calling context of a called procedure. To illustrate this problem, and the shortcomings of Weiser's algorithm, consider the following example program, which sums the integers from 1 to 10:

| program MAIN | procedure A (x,y) | procedure Add(a,b) | procedure Increment(z) |
|---|---|---|---|
| sum: = 0; | call Add(x,y); | a: = a + b | call Add(z,1) |
| i: = 1; | call Increment(y) | return | return |
| while i < 11 do | return | | |
|   call A(sum, i) | | | |
| od | | | |
| end | | | |

Using Weiser's algorithm to slice this program with respect to variable z and the return statement of procedure Increment, we obtain everything from the original program. However, inspection reveals that computations involving the variable sum do not contribute to the value of z at the end of procedure Increment; in particular, neither the initialization of sum in procedure MAIN nor the call to Add from procedure A (which adds the current value of i to sum) should be included in the slice. The reason these statements are included in the slice computed by Weiser's algorithm is (roughly) the following. The statement "call Add(z,l)" in procedure Increment causes the slice to "descend" into procedure Add; when the slice reaches the beginning of Add it "ascends" to all sites that call Add, both the site in Increment at which it "descended" and the (irrelevant) site in A.

A more precise slice consists of the following elements:

| program MAIN | procedure A (y) | procedure Add(a,b) | procedure Increment(z) |
|---|---|---|---|
| i: = 1; | call Increment(y) | a: = a + b | call Add(z,1) |
| while i < 11 do | return | return | return |
|   call A(i) | | | |
| od | | | |
| end | | | |

This set of program elements is computed by the slicing algorithm described below.

To sidestep the calling-context problem, system dependence graphs include some data-dependence edges that represent transitive dependences. The cornerstone of the construction of the invention is the use of an attribute grammar to represent calling and parameter-linkage relationships among procedures. The step of computing the required transitive-dependence edges is reduced to the construction of the subordinate characteristic graphs for the grammar's nonterminals. It is important to understand the distinction between the two different but related "slicing problems:"

VERSION (1')

The slice of a program with respect to program point p and variable x consists of all statements and predicates of the program that might affect the value of x at point p.

VERSION (2)

The slice of a program with respect to program point p and variable x consists of a reduced program that computes the same sequence of values for x at p. That is, at point p the behavior of the reduced program with respect to variable x is indistinguishable from that of the original program.

For intraprocedural slicing, a solution to Version (1) provides a solution to Version (2), since the "reduced program" required in Version (2) can be obtained by restricting the original program to just the statements and predicates found in the solution for Version (1).

For interprocedural slicing, restricting the original program to just the statements and predicates found for Version (1) does not necessarily yield a program that is a satisfactory solution to Version (2). The reason has to do with multiple calls to the same procedure: It is possible that the program elements found by an algorithm for Version (1) will include more than one such call, each passing a different subset of the procedure's parameters. (It should be noted that, although it is imprecise, Weiser's algorithm produces a solution to Version (2).)

The present invention addresses Version (1) of the slicing problem. The interprocedural slicing algorithm presented identifies a subgraph of the system dependence graph whose components might affect the values of the variables defined at or used at a given program point p. A solution to Version (2) requires defining a mapping from this subgraph to a program whose behavior at p is indistinguishable from the original program. This mapping may involve duplicating code to specialize procedure bodies to particular parameter-usage patterns.

PROGRAM DEPENDENCE GRAPHS AND PROGRAM SLICES

Different definitions of program dependence representations have been given, depending on the intended application; nevertheless, they are all variations on a theme introduced in Kuck, D.J., Mursoka, Y., and Chen, S.C., "On the number of operations simultaneously executable in FORTRAN-like programs and their resulting speed-up," IEEE Trans. on Computers C-21(12) pp. 1293-1310 (December 1972), and share the common feature of having explicit representations of both control dependencies and data dependencies. The definition of program dependence graph presented here is similar, but not identical, to the program dependence representation used by others, such as the "program dependence graphs" defined in Ferrante, J., Ottenstein, K., and Warren, J., "The program dependence graph and its use in optimization," ACM Transactions on Programming Languages and Systems 9(3) pp. 319-349 (July 1987) and the "dependence graphs" defined in Kuck, D.J., Kuhn, R.H., Leasure, B., Padua, D.A., and Wolfe, M., "Dependence graphs and compiler optimizations," pp. 207-218 in Conference Record of the Eighth ACM Symposium on Principles of Programming Languages, (Williamsburg, VA, January 26-28, 1981), ACM, New York, NY (1981).

The definition of program dependence graph presented below is for a language with scalar variables, assignment statements, conditional statements, while loops, and a restricted kind of "output statement" called an end statement. An end statement, which can only appear at the end of a program, names one or more of the variables used in the program; when execution terminates, only those variables will have values in the final state. Intuitively, the variables named by the end statement are those whose final values are of interest to the programmer.

THE PROGRAM DEPENDENCE GRAPH

The program dependence graph for program P, denoted by $G_p$, is a directed graph whose vertices are connected by several kinds of edges. The vertices of $G_p$ represent the assignment statements and control predicates that occur in program P. In addition, $G_p$ includes three other categories of vertices:

(1) There is a distinguished vertex called the entry vertex.

(2) For each variable x for which there is a path in the standard control-flow graph for P on which x is used before being defined, there is a vertex called the initial definition of x. See, Aho, A.V., Sethi, R., and Ullman, J.D., Compilers: Principles, Techniques, and Tools, Addison-Wesley, Reading MA (1986). This vertex represents an assignment to x from the initial state. The vertex is labeled "x := InitialState(x)".

(3) For each variable x named in P's end statement, there is a vertex called the final use of x. It represents an access to the final value of x computed by P, and is labeled "FinalUse(x)".

The edges of $G_p$ represent dependencies among program components. An edge represents either a control dependency or a data dependency. Control dependency edges are labeled either true or false, and the source of a control dependency edge is always the entry vertex or a predicate vertex. A control dependency edge from vertex $v_1$ to vertex $v_2$, denoted by $v_1 \rightarrow_c v_2$, means that during execution, whenever the predicate represented by $v_1$ is evaluated and its value matches the label on the edge to $v_2$, then the program component represented by $v_2$ will be executed (although perhaps not immediately). A method for determining control dependency edges for arbitrary programs is given in Ferrante, J., Ottenstein, K., and Warren, J., supra; however, because we are assuming that programs include only assignment, conditional, and while statements, the control dependency edges of $G_p$ can be determined in a much simpler fashion. For the language under consideration here, a program dependence graph contains a control dependency edge from vertex vl to vertex $v_2$ of Gp if and only if one of the following holds:

i) $v_1$ is the entry vertex, and $v_2$ represents a component of P that is not subordinate to any control predicate; these edges are labeled true.

ii) $v_1$ represents a control predicate, and $v_2$ represents a component of P immediately subordinate to the control construct whose predicate is represented by $v_1$. If $v_1$ is the predicate of a while-loop, the edge $v_1 \rightarrow_c v_2$ is labeled true; if $v_1$ is the predicate of a conditional statement, the edge $v_1 \rightarrow_c v_2$ is labeled true or false according to whether $v_2$ occurs in the then branch or the else branch, respectively.

A data dependency edge from vertex $v_1$ to vertex $v_2$ means that the program's computation might be changed if the relative order of the components represented by $v_1$ and $v_2$ were reversed. As used herein, program dependence graphs contain two kinds of data-dependency edges, representing flow dependencies and def-order dependencies.

A program dependence graph contains a flow dependency edge from vertex $v_1$ to vertex $v_2$ if and only if all of the following hold:

i) $v_1$ is a vertex that defines variable x.

ii) $v_2$ is a vertex that uses x.

iii) Control can reach $v_2$ after $v_1$ via an execution path along which there is no intervening definition of x. That is, there is a path in the standard control-flow graph for the program by which the definition of x at $v_1$ reaches the use of x at $v_2$. (Initial definitions of variables are considered to occur at the beginning of the control-flow graph.)

A flow dependency that exists from vertex $v_1$ to vertex $v_2$ will be denoted by $v_1 \rightarrow_f v_2$.

Flow dependencies can be further classified as loop carried or loop independent. A flow dependency $v_1 \rightarrow_f v_2$ is carried by loop L, denoted by $v_1 \rightarrow_{lc(L)} v_2$, if in addition to i), ii), and iii) above, the following also hold:

iv) There is an execution path that both satisfies the conditions of iii) above and includes a backedge to the predicate of loop L.

v) Both $v_1$ and $v_2$ are enclosed in loop L.

A flow dependency $v_1 \rightarrow_f v_2$ is loop independent, denoted by $v_1 \rightarrow_{li} v_2$, if in addition to i), ii), and iii) above, there is an execution path that satisfies iii) above and includes no backedge to the predicate of a loop that encloses both $v_1$ and $v_2$. It is possible to have both $\overrightarrow{v_1 lc(l) v_2}$ and $\overrightarrow{v_1 li v_2}$.

A program dependence graph contains a def-order dependency edge from vertex $v_1$ to vertex $v_2$ if and only if all of the following hold:

i) $v_1$ and $v_2$ both define the same variable.

ii) $v_1$ and $v_2$ are in the same branch of any conditional statement that encloses both of them.

iii) There exists a program component $v_3$ such that $v_1 \rightarrow_f v_3$ and $v_2 \rightarrow_f v_3$.

iv) $v_1$ occurs to the left of $v_2$ in the program's abstract syntax tree.

A def-order dependency from $v_1$ to $v_2$ (with "witness" $V_3$) is denoted by $\overrightarrow{v_{1do(v_3)}} v_2$.

Note that a program dependence graph is a multi-graph (i.e., it may have more than one edge of a given kind between two vertices). When there is more than one loop-carried flow dependency edge between two vertices, each is labeled by a different loop that carries the dependency. When there is more than one def-order edge between the two vertices, each is labeled by a vertex that is flow-dependent on both the definition that occurs at the edge's source and the definition that occurs at the edge's target.

EXAMPLE

FIG. 1 shows an example program and its program dependence graph. The boldface arrows represent control dependency edges; dashed arrows represent def-order dependency edges; solid arrows represent loop-independent flow dependency edges; solid arrows with a hash mark represent loop-carried flow dependency edges.

The data-dependency edges of a program dependence graph are computed using data-flow analysis. For the restricted language considered in this section, the necessary computations can be defined in a syntax-directed manner.

PROGRAM SLICES

For vertex s of program dependence graph G, the slice of G with respect to s, denoted by G/s, is a graph containing all vertices on which s has a transitive flow or control dependence (i.e., all vertices that can reach s via flow and/or control edges): $V(G/s) = \{w \mid w \in V(G) \wedge \overline{wc,f^2}\}$. We extend the definition to a set of vertices $$S = \bigcup_i s_i$$

as follows:

$$V(G/S) = V\left(G/\left(\bigcup_i s_i\right)\right) = \bigcup_i V(G/s_i)$$

FIG. 2 gives a simple worklist algorithm for computing the vertices of a slice using a program dependence graph.

The edges in the graph G/S are essentially those in the subgraph of G induced by V(G/S), with the exception that a def-order edge $\overrightarrow{v_{so(\mu)}}w$ is included only if $G_s/S$ contains the vertex that is directly flow dependent on the definitions at v and w. In terms of the three types of edges in a program dependence graph we define $$E(G/S) = \left\{\left(v \xrightarrow{f} w\right)\left(v \xrightarrow{f} w\right) \epsilon E(G) \wedge v, w \epsilon V(G/S)\right\}$$
$$\cup \left\{\left(v \xrightarrow{c} w\right)\left(v \xrightarrow{c} w\right) \epsilon E(G) \wedge v, w \epsilon V(G/S)\right\}$$
$$\cup \left\{\left(v \xrightarrow{do(U)} w\right)\left(v \xrightarrow{do(U)} w\right) \epsilon E(G) \wedge u, v, w \epsilon V(G/S)\right\}$$

EXAMPLE

Figure 3:
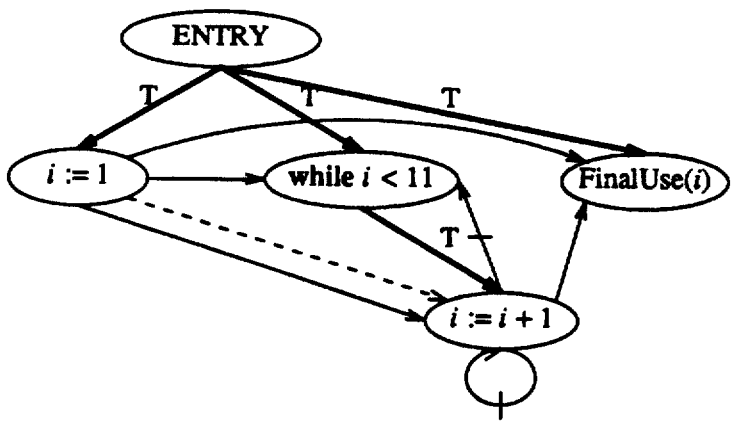
FIG. 3 is the graph and the corresponding program that result from slicing the program dependence graph from FIG. 1 with the final-use vertex for i.

FIG. 3 shows the graph resulting from taking a slice of the program dependence graph from FIG. 1 with respect to the final-use vertex for i.

We say that G is a feasible program dependence graph if and only if G is the program dependence graph of some program P. For any $S \subseteq V(G)$, if G is a feasible program dependence graph, then the slice G/S is also a feasible program dependence graph; it corresponds to the program P' obtained by restricting the syntax tree of P to just the statements and predicates in V(G/S).

The significance of an intraprocedural slice is that it captures a portion of a program's behavior. The programs P' and P, corresponding to the slice G/S and the graph G, respectively, compute the same final values for all variables x for which FinalUse(x) is a vertex in S.

A listing of a computer program that carries out the construction of intraprocedural program dependence graphs and program slicing is set forth in the microfiche appendix.

DATA DEPENDENCES

We now turn to the question of how to compute the data dependences that appear in a program's dependence graph. We present definitions, expressed with attribute grammars, that described how to generate loop-independent flow dependence edges, loop-carried flow dependence edges, and def-order dependence edges. For each case, the definition is presented as an attribute grammar over the following (ambiguous) context-free grammar:

Root→S
S→ID := Exp
$S_1$→$S_2$; $S_3$
$S_1$→if Exp then $S_2$ else $S_3$ fi
$S_1$→while Exp do $S_2$ od Our definitions will describe how to translate from a program, expressed as a derivation tree of the grammer given above, to the dependence edges of the program's dependence graph. (In the grammar shown above, the subscripts on the S's are not meant to indicate different nonterminals; they are used to distinguish between the different occurrences of S in each production. For example, in the second production, the three occurrences of nonterminal S are labeled $S_1$, $S_2$, and $S_3$.)

ATTRIBUTE GRAMMARS AND ATTRIBUTE EVALUATION

The concept of an attribute grammar provides a very powerful mechanism for specifying translations. In this section, we introduce the relevant terminology and discuss two simple algorithms for attribute-evaluation, which serves as the underlying computational mechanism for translations specified with attribute grammars.

An attribute grammar is a context-free grammar extended by attaching attributes to the nonterminal symbols of the grammar, and by supplying attribute equations to define attribute values. In every production p: $X_0 \rightarrow X_1 \ldots X_k$, each $X_i$ denotes an occurrence of a grammar symbol; associated with each nonterminal occurrence is a set of attribute occurrences corresponding to the nonterminal's attributes.

Each production has a set of attribute equations; each equation defines one of the production's attribute occurrences as the value of an attribute-definition function applied to other attribute occurrences in the production. The attributes of a nonterminal are divided into two disjoint classes: synthesized attributes and inherited attributes. Each attribute equation defines a value for a synthesized attribute occurrence of the left-hand side nonterminal or an inherited attribute occurrence of a right-hand side nonterminal.

A derivation tree node X defines a set of attribute instances, corresponding to the attributes of the syntactic category of X. Because attribute values "flow" both up and down the tree, it is (ordinarily) necessary to impose conditions to ensure that no attribute instances are defined circularly. Such a restriction is formalized using the concept of an attribute dependence graph, a directed graph that represents functional dependences among the attribute instances of a production p or tree T, denoted D(p) and D(T), respectively, and defined as follows:

(a) For each attribute instance b, the attribute dependence graph contains a vertex b'.

(b) If attribute instance b is an argument of attribute instance c, the attribute dependence graph contains a directed edge (b',c'), from b' to c'.

An edge from b' to c' has the meaning: b' is used to determine the value of c'. An attribute grammar is non-circular when the attribute dependence graph of every possible derivation tree is acyclic.

Although closely related, an attribute instance b in T and the vertex b' in D(T) are different objects. When this distinction is not made explicitly clear, the intended meaning should be clear from the context. Vertices of D(T) with no incoming edges correspond to attribute instances defined by O-ary attribute definition functions, i.e. constants.

A node's subordinate and superior characteristic graphs provide a convenient representation of transitive dependencies among the node's attributes. (A transitive dependency exists between attributes that are related in the transitive closure of the tree's attribute dependency relation, or, equivalently, that are connected by a directed path in the tree's dependency graph.) The vertices of the characteristic graphs at node r correspond to the attributes of r; the edges of the characteristic graphs at r correspond to transitive dependencies among r's attributes.

The subordinate characteristic graph at r is the projection of the dependencies of the subtree rooted at r onto the attributes of r. To from the superior characteristic graph at node r, we imagine that the subtree rooted at r has been pruned from the derivation tree, and project the dependency graph of the remaining tree onto the attributes of r. To define the characteristic graphs precisely, we make the following definitions:

Given a directed graph $G = (V, E)$, a path from vertex a to vertex b is a sequence of vertices, $[v_1, v_2, \ldots, v_k]$, such that: $a = v_1$, $b = v_k$, and $[(v_i, v_{i+1})|i = 1, \ldots, k - 1]$ E.
Given a directed graph $G = (V, E)$ and a set of vertices $V' \subseteq V$, the projection of G onto V' is defined as:
$G/V' = (V', E')$
where $E' = [(v, w) \mid v, w \in V'$ and there exists a path $[v = v_1, v_2, \ldots, v_k = w]$ such that $v_2, \ldots, v_{k-1} \notin V'$.
(That is, G/V' has an edge from $v \in V'$ to $w \in V'$ when there exists a path from v to w in G that does not pass through any other elements of V'.)

The subordinate and superior characteristic graphs of a node r, denoted r.C and r.C̄, respectively, are defined formally as follows: Let r be a node in tree T, let the subtree rooted at r be denoted Tr, and let the attribute instances at r be denoted A(r), then the subordinate and superior characteristic graphs at r satisfy:

$r.C = D(T_r)/A(r)$ $r.\overline{C} = (D(T) - D(T_r))/A(r)$

A characteristic graph represents the projection of attribute dependencies onto the attributes of a single tree node; consequently, for a given grammar, each graph is bounded in size by some constant.

An attributed tree is a derivation tree together with an assignment of either a value or the special token null to each attribute instance of the tree. A attributed tree is fully attributed if each of its attribute instances is available, i.e. non-null. To analyze a string according to its attribute grammar specification, first construct its attributed tree with an assignment of null to each attribute instance, and then evaluate as many attribute instances as possible, using the appropriate equation as an assignment statement. The latter process is termed attribute evaluation.

The order in which attributes are evaluated is arbitrary, subject to the constraint that each attribute definition function be evaluated only when all of its argument attributes are available. When all the arguments of an unavailable attribute instance are available, we say it is ready for evaluation. Using this definition, algorithm Evaluate of Table 1 below states the method of Knuth, D.E., "Semantics of context-free languages," Math Syst Theory2(2) pp. 127-145 (June 1968) for evaluating an attributed tree.

TABLE 1

```
procedure Evaluate(T)
declare
    T: an unevaluated attributed tree
    b: an attribute instance
begin
    while there exists b ready for evaluation do
        evaluate b
    od
end
```

When Evaluate is applied to an attributed tree T, its attributes are evaluated in an order that respects the partial order given by the attribute dependence graph, D(T). In practice, there must be some method for selecting the next attribute instance to evaluate; practical algorithms may be viewed as instances of Evaluate that use different selection methods. Because each attribute instance of T causes Evaluate to perform exactly one application of an attribute-definition function, we would like the total cost of this selection process to be no more than $O(|D(T)|)$.

One satisfactory method is to maintain a work-list S of all attribute instances that are ready for evaluation, as is done in the version of algorithm Evaluate shown in Table 2. The initial members of S—the attributes of T that have no arguments—can be found in $O(|D(T)|)$ by traversing T. Set insertion and deletion can be done in unit time using standard techniques; thus the cost of the version of Evaluate shown in Table 2 is $O(|D(T)|)$.

FLOW DEPENDENCES

This section discusses the notion of flow dependence for languages with (only) scalar variables under the assumption that no variables are aliased.

TABLE 2

```
procedure Evaluate(T)
declare
    T: an unevaluated attributed tree
    S: a set of attribute instances that are ready for evaluation
    b,c: attribute instances
begin
    S: = the attribute instances of T with no arguments
    while S ≠ ∅ do
        Select and remove an attribute instance b from S
        evaluate b
```

TABLE 2-continued

```
        for each c that is a successor of b do
            If c is ready for evaluation then Insert c in S fi
        od
    od
end
```

A flow dependence from program point q to program point p represents the possibility that, in some execution of the program, q will write the contents of x and p will read what q wrote. Flow dependences can be defined in terms of the more general concept of reaching definitions: a definition of variable x at some program point q is said to reach point p if there is an execution path from q to p such that no other definition of x appears on the path. (A definition q that reaches p represents the possibility that, in some execution of the program, q may write the contents of x and x will not have been overwritten when p executes.)

It is often convenient to represent flow dependences in the form of sets associated with variable-use sites, so that for each variable x used at program point p, p is associated with the set of all the program points that define x and reach p. (These sets are also called use-definition chains.)

To compute use-definition chains, one first computes the reaching definitions associated with each program point. Below we give an attribute grammar definition that expresses how to compute a program's reaching definitions. This definition leads to an algorithm for computing reaching definitions, for example, by using techniques for evaluating attributed trees described in the previous section.

To express the reaching-definitions problem with an attribute grammar, we use four attributes for each S nonterminal: exposedDefs, killedVars, reaching Defs-Before, and reachingDefsAfter. The reachingDefs-Before attribute is an inherited attribute of S; the other three are synthesized attributes of S. The exposedDefs, reachingDefsBefore, and reachingDefsAfter attributes are sets of pairs of the form <variable name, program location>.

The silledVars attributes are sets of variable names. The equations that relate these attributes are given in Table 3 below.

TABLE 3

```
attributes
    S.exposedDefs:              synthesized
    S.killedVars:               synthesized
    S.reachingDefsBefore:       inherited
    S.reachingDefsAfter:        synthesized
attribute equations
Root → S
    S.reachingDefsBefore = ∅
S → Id: = Exp
    S.killedVars = [Id]
    S.exposedDefs = <Id,&S>
    S.reachingDefsAfter = [<i,q> | <i,q>
    ∈S.reachingDefsBefore    i ≠ Id]∪[<Id,&S>]
S₁ → S₂; S₃
    S₁.killedVars = S₂.killedVars∪S₃.killedVars
    S₁.exposedDefs = [<i,q> | <i,q>∈S₂.exposedDefs
        i   S₃.killedVars]∪S₃.exposedDefs
    S₂.reachingDefsBefore = S₁.reachingDefsBefore
    S₃.reachingDefsBefore = S₂.reachingDefsAfter
    S₁.reachingDefsAfter = S₃.reachingDefsAfter
S₁ → If Exp then S₂ else S₃
    S₁.killedVars = S₂.killedVars∩S₃.killedVars
    S₁.exposedDefs = S₂.exposedDefs∪S₃.exposedDefs
    S₂.reachingDefsBefore = S₁.reachingDefsBefore
    S₃.reachingDefsBefore = S₁.reachingDefsBefore
    S₁.reachingDefsAfter = S₂.reachingDefsAfter
```

TABLE 3-continued

```
        ∪S₃.reaching DefsAfter
S₁ → while Exp do S₂ od
    S₁.killedVars = ∅
    S₁.exposedDefs = S₂.exposedDefs
    S₂.reachingDefsBefore = S₁.reachingDefsBefore
        ∪S₂.exposedDefs
    S₁.reachingDefsAfter = S₁.reachingDefsBefore
        ∪S₂.exposedDefs
```

The attribute S.killedVars consists of the set of variables that are assigned to in S. For an assignment statement this is just the left-hand side Id of the statement. Note that, because the body of a while-loop may never execute, a while-loop as a whole is not guaranteed to make an assignment to any variable, so S₁.killedVars is the empty set.

A definition d is in S-exposedDefs if d is downwards exposed in S, that is, if d is a definition that occurs within S and d reaches the end of S. Thus, if S is an assignment statement, the pair <Id,&S> is in S.exposedDefs because the definition of Id reaches the end of S. (The notation "&S" denotes the program point represented by S.) For the statement-concatenation production, the definitions reaching the end of S₁ are the exposed definitions from S₂ that are not killed in S₃ together with the exposed definitions from S₃.

The S.reachingDefsBefore and S.reachingDefsAfter attributes consist of the definitions that reach the beginning and end of S, respectively. For example, in an assignment statement Id :=Exp, the definitions in reachingDefsAfter are the definitions in reachingDefsBefore that are not killed by the assignment to Id (i.e., those definitions whose variable was not overwritten by the assignment to Id), together with <Id,&S>, which represents the assignment itself.

In a while-loop, S₁.reachingDefsAfter represents the set of definitions that possibly reach the end of the loop; it is given the value S₁reachingDefsAfter = S₁.reachingDefsBefore ∪ S₂ exposedDefs.

S₁ reachingDefsBefore contributes the definitions that occur earlier than the while-loop, and S₂exposedDefs contributes the exposed definitions that occur within the loop body. The equation for the S₂ reachingDefsBefore attribute of a while-loop has the same right-hand side (and hence the same value) since any definition that reaches the end of the loop also reaches the beginning of the loop body.

S₂.reachingDefsBefore = S₁.reachingDefsBefore ∪ S₂.exposedDefs.

Given the reachingDefsBefore attribute for each statement S, we can compute the program points that are sources of flow dependence edges incident on S by restricting S.reachingDefsBefore to the set of variables used in an expression that occurs at S. Assuming that an Exp nonterminal has an attribute used that consists of all variables used in Exp, the flow source for assignment statements, conditional statements, and while-loops would be computed by FlowSources (S₁)={q | <i, q> ∈S₁.reachingDefsBefore∈i} Exp.used}.

SPECIFYING LOOP-CARRIED REACHING DEFINITIONS WITH AN ATTRIBUTE GRAMMAR

To express the compution of loop-carried reaching definitions with an attribute grammar, the exposedDefs, reachingDefsBefore, and reachingDefsAfter attributes are changed to be sets of triples of the form. < variable name, program location, program location >.

The first program location that occurs in a triple indicates the location of a definition; the second program location either contains the value null or the location of one of the program's loops. The revised equations that express the relationships between the attributes are presented in Table 4.

TABLE 4

| attributes | |
|---|---|
| S.exposedDefs: | synthesized |
| S.killedVars: | synthesized |
| S.reachingDefsBefore: | inherited |
| S.reachingDefsAfter: | synthesized | attribute equations
Root → S
  S.reachingDefsBefore = ∅
S → Id: = Exp
  S.killedVars = [Id]
  S.exposedDefs = <Id,&S,null>
  S.reachingDefsAfter = [<i,q,l> | <i,q,l>
    ∈S.reachingDefsBefore   i ≠ Id]∪[<Id,&S,null>]
$S_1$ → $S_2$; $S_3$
  $S_1$.killedVars = $S_2$.killedVars∪$S_3$.killedVars
  $S_1$.exposedDefs = [<i,q,l> | <i,q,l>∈$S_2$.exposedDefs
    i  $S_3$.killedVars]∪$S_3$.exposedDefs
  $S_2$.reachingDefsBefore = $S_1$.reachingDefsBefore
  $S_3$.reachingDefsBefore = $S_2$.reachingDefsAfter
  $S_1$.reachingDefsAfter = $S_3$.reachingDefsAfter
$S_1$ → If Exp then $S_2$ else $S_3$
  $S_1$.killedVars = $S_2$.killedVars∩$S_3$.killedVars
  $S_1$.exposedDefs = $S_2$.exposedDefs∪$S_3$.exposedDefs
  $S_2$.reachingDefsBefore = $S_1$.reachingDefsBefore
  $S_3$.reachingDefsBefore = $S_1$.reachingDefsBefore
  $S_1$.reachingDefsAfter = $S_2$.reachingDefsAfter
    ∪$S_3$.reachingDefsAfter
$S_1$ → while Exp do $S_2$ od
  $S_1$.killedVars = ∅
  $S_1$.exposedDefs = $S_2$.exposedDefs
  $S_2$.reachingDefsBefore = $S_1$.reachingDefsBefore
    ∪[<i,q,&$S_1$> | <i,q,null>∈$S_2$.exposedDefs]
  $S_1$.reachingDefsAfter = $S_1$.reachingDefsBefore
    ∪$S_2$.exposedDefs The essential differences between Table 4 and Table 3 are found in the equations for assignment statements and while-loops. In an assignment statement, the locally generated definition is tagged with null; this occurs in the equation for S.exposedDefs as well as for S.reachingDefsAfter, so follows:

$S.exposedDefs = <Id,\&S,null>$ $S.reachingDefsAfter = <i,q,l> | <i,q,l>\epsilon$ $s.reachingDefsBefore\wedge i\neq Id\}\cup\{<Id,\&S, null>\}.$ The $S_2$.reachingDefsBefore attribute of a while-loop is handled differently than in Table 3 because it is necessary to tag the definitions in $S_2$.exposedDefs with &$S_1$ to indicate the loop carrying these reaching definitions.

$S_2$.reachingDefsBefore = $S_1$.reachingDefsBefore ∪
  { <i,q, &$S_1$> | <i,q,null>∈$S_2$. exposedDefs}.

All other equations are essentially unchanged.

Having computed the reaching definitions for each statement S, we can determine the sources of flow dependence edges by the equation.

$FlowSources(S_1)=\{q| <i.q,l>\epsilon S_1.$
  reachingDefsBefore i∈Exp.used}.

To compute separately the sources of loop-independent and loop-carried flow dependences for each use site, the FlowSources set may be partitioned into the reaching definitions with null and non-null third components, respectively:

LoopIndependentFlowSources($S_1$) = {q| <i,q,null>∈
  $S_1$.reachingDefsBeforeΛi∈Exp.used}
LoopCarriedFlowSources($S_1$) = {q| <i,q,l>∈
  $S_1$.reachingDefsBeforeΛi∈Exp.usedΛl≠null}.

DEF-ORDER DEPENDENCES

Determining the def-order dependences that occur in a program also depends on having computed the program's sets of reaching definitions. A program's sets of def-order dependences may be expressed by attaching five additional attributes to each S nonterminal: flowEdgesWithTargetsSubordinate, flowEdges, flowEdgesWithSourcesSubordinate;flowEdgesBefore, and flowEdgesAfter. The values of these attributes are sets of pairs of program locations, where each pair represents the source and target of a flow edge. The flowEdgesWithTargetsSubordinate attribute is a synthesized attribute of S whose elements represent flow edges whose targets occur in the program fragment that is subordinate to S. Thus, the value of S.flowEdgesWithTargetsSubordinate in the production Root→S represents the set of flow edges in the entire program. This value is then broadcast throughout the tree via the inherited attribute flowEdges. The flowEdgesWithTargetsSubordinate attribute is a synthesized attribute of S whose elements represent flow edges whose sources occur in the program fragment that is subordinate S. The attributes flowEdgesBefore and flowEdgesAfter thread information through the program left to right.

The equations for these attributes are shown in FIG. 15. The flowEdgesBefore attribute is an inherited attribute of S whose elements represent flow edges whose sources occur either subordinate to S or to the right of S's parent. The flowEdgeAfter attribute is a synthesized attribute of S whose elements represent flow edges whose sources occur to the right of S's parent. For example, at each assignment statement S, the set that is passed on to S.flowEdgesAfter is S.flowEdgesBefore without the flow edges whose source is S.

Figure 16:
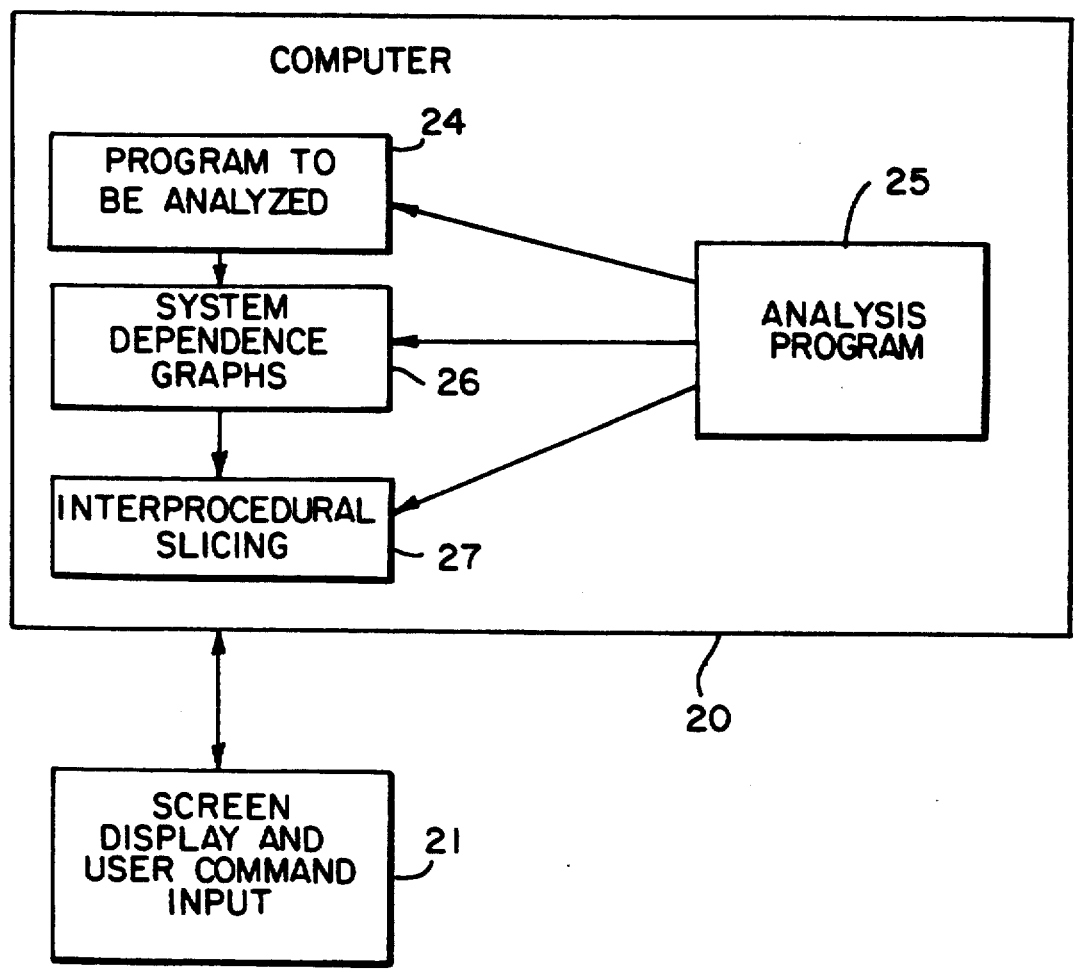
FIG. 16 is a schematic system diagram for carrying out interprocedural slicing utilizing system dependence graphs.

For each assignment statement S of a program, we use the value of S.flowEdgesBefore to compute the targets of all def-order edges whose source is S;a def-order edge S do(u)$^t$ exists for each t such that $<s,u> \epsilon S.flowEdgesBefore \wedge <t,u> \epsilon S.flowEdges$-
  $BeforeAs=\&SAs\neq t$ FIG. 16 shows a computer system having upper input and output composed of a screen display and user command 21. The program to be analyzed 24 is operated on by an analysis program 25 to create system dependence graphs 26, as set forth below. The system dependence graphs 26 are then utilized to carry out interprocedural slicing 27 in accordance with the analysis program 25.

THE SYSTEM DEPENDENCE GRAPH: AN INTERPROCEDURAL DEPENDENCE GRAPH REPRESENTATION

We now turn to the definition of the system dependence graph. The system dependence graph, an extension of the dependence graphs defined above, represents a program in a language that includes procedures and procedure calls.

Our definition of the system dependence graph models a language with the following properties:

(1) A complete system consists of a single (main) program and a collection of auxiliary procedures.

(2) Procedures end with return statements instead of end statements (as defined above). A return statement does not include a list of variables.

(3) Parameters are passed by value-result.

It should become clear that this approach is not tied to the particular language features enumerated above. Modeling different features will require some adaptation; however, the basic approach is applicable to languages that allow nested scopes and languages that use different parameter-passing mechanisms. The definition of system dependence graphs presented here relies on the absence of aliasing. How to convert a program with aliasing into one that is alias free is discussed further below. In the absence of aliasing, global variables can be treated simply as additional parameters to each procedure; thus globals are not explicitly discussed here.

A system dependence graph includes a program dependence graph, which represents the system's main program, procedure dependence graphs, which represent the system's auxiliary procedures, and some additional edges. These additional edges are of two sorts (1) edges that represent direct dependencies between a call site and the called procedure, and (2) edges that represent transitive dependencies due to calls.

The following description discusses how procedure calls and procedure entry are represented in procedure dependence graphs and how edges representing dependencies between a call site and the called procedure are added to connect these graphs together This material defines the linkage grammar, an attribute grammar used to represent the call structure of a system. Transitive dependencies due to procedure calls are computed using the linkage grammar and are added as the final step of building a system dependence graph.

In the discussion below, we use "procedure" as a generic term referring to both the main program and the auxiliary procedures when the distinction between the two is irrelevant.

PROCEDURE CALLS AND PROCEDURE LINKAGES

Extending the definition of dependence graphs to handle procedure calls requires representing procedure linkages: the passing of values between procedures. In designing the representation of procedure linkages we have three goals:

(1) It should be possible to build an individual procedure's procedure dependence graph (including the computation of data dependencies) with minimal knowledge of other system components.

(2) The system dependence graph should consist of a straightforward connection of the program dependence graph and procedure dependence graphs.

(3) It should be possible to extract efficiently a precise interprocedural slice by traversing the graph via a procedure analogous to the procedure MarkVerticesOfSlice given in FIG. 2.

To meet the goals outlined above, our graphs model the following non-standard, two-stage mechanism for run-time procedure linkage. When procedure P calls procedure Q, values are transferred from P to Q by means of an intermediate call linkage dictionary, $\delta_Q$. Values are transferred back from Q to P through a return linkage dictionary, $\delta_Q'$. Before the call, P copies values into the call dictionary; Q then initializes local variables from this dictionary. Before returning, Q copies return values into the return dictionary, from which P retrieves them.

This model of procedure linkage is represented in procedure dependence graphs through the use of five new kinds of vertices. A call site is represented using a call-site vertex; information transfer is represented using four kinds of linkage vertices. On the calling side, information transfer is represented by a set of pre and postprocessing vertices These vertices, which are control dependent on the call-site vertex, represent assignment statements that copy values into the call dictionary and out of the return dictionary, respectively. Similarly, information transfer in the called procedure is represented by a set of initialization and finalization vertices. These vertices, which are control dependent on the procedure's entry vertex, represent assignment statements that copy values out of the call dictionary and into the return dictionary, respectively.

Using this model, data dependencies between procedures are limited to dependencies from preprocessing vertices to initialization vertices and from finalization vertices to postprocessing vertices. Connecting procedure dependence graphs to form a system dependence graph is straightforward, involving the addition of three new kinds of edges (1) a call edge is added from each call-site vertex to the corresponding procedure-entry vertex; (2) a linkage-entry edge is added from each preprocessing vertex at a call site to the corresponding initialization vertex in the called procedure; (3) a linkage-exit edge is added from each finalization vertex in the called procedure to the corresponding postprocessing vertex at the call site. (Call edges are a new kind of control dependency edge; linkage-entry and linkage-exit edges are new kinds of data dependency edges.)

Another advantage of this model is that flow dependencies within a procedure can be computed in the usual way, using data flow analysis on the procedure's control-flow graph in which each procedure cell is replaced with the appropriate sequence of assignments to the cell dictionary followed by the appropriate sequence of assignments from the return dictionary.

An important question in which values are transferred from a call site to the called procedure and back again. This point is discussed further below, which presents a strategy in which the results of interprocedural data flow analyses are used to omit some linkage vertices from procedure dependence graphs. For now, we will assume that all actual parameters are copied into the call dictionary and retrieved from the return dictionary. Thus, the linkage vertices associates with a cell from procedure P to procedure Q are defined as follows ($G_p$ denotes the procedure dependence graph for P):

In $G_p$, subordinate to the cell-site vertex that represents the call to Q, there is a pre-processing vertex for each actual parameters e of the call to Q. The pre-processing vertices are labeled $e_Q(r) := e$, where r is the formal parameter name.

For each actual parameter a that is a variable rather than an expression, there is a postprocessing vertex. These are labeled $a := e'_Q(r)$ for actual parameter a and corresponding formal parameter r.

The linkage vertices associated with the entry to procedure Q and with the return from procedure Q are defined as follows ($G_Q$ denotes the procedure dependence graph for Q):

For each parameter of Q, $G_Q$ consists an initialization vertex and a finalization vertex. These vertices are labeled $r := \epsilon_Q(r)$, and $\epsilon_Q'(r) := r$ respectively, where r is the formal parameter name.

EXAMPLE

Figure 4:
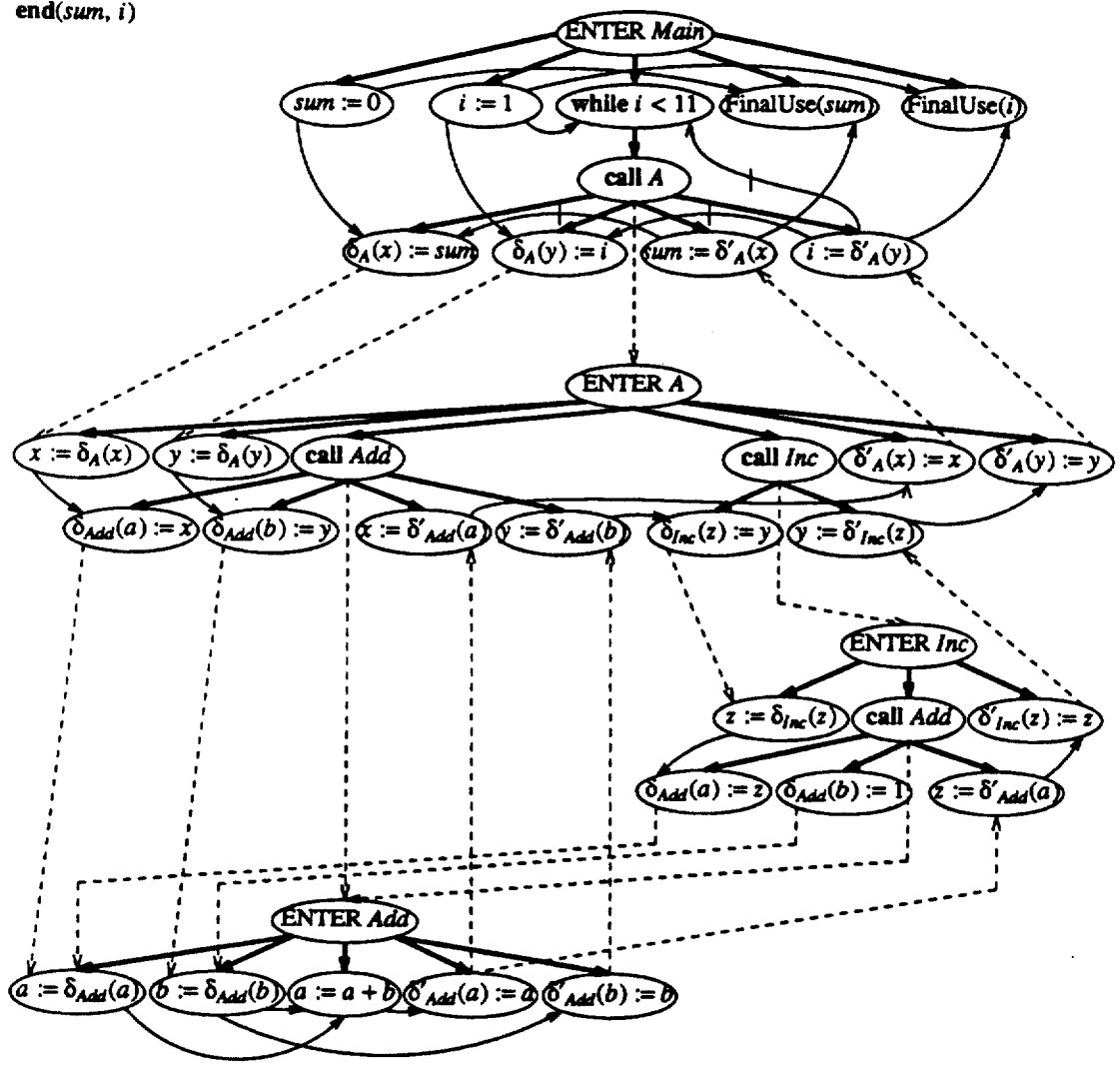
FIG. 4 is an example system and corresponding program and procedure dependence graphs connected with linkage entry, linkage-exit, and call edges.

FIG. 4 repeats the example system from above and shows the corresponding program and procedure dependence graphs connected with linkage-entry edges, linkage-exit edges, and call edges. (In this FIG. as well as in the remaining FIGS. def-order edges are not shown.) Edges representing control dependencies are shown in boldface and are not labeled (all such edges would be labeled true); edges representing intraprocedural flow dependencies are shown using arcs; linkage-entry edges, linkage-exit edges, and call edges are shown using dashed lines.

THE LINKAGE GRAMMAR: AN ATTRIBUTE GRAMMAR THAT MODELS PROCEDURE-CALL STRUCTURE

The linkage grammar is an attribute grammar that models the call structure of each procedure as well as the intraprocedural transitive flow dependencies among the procedures' linkage vertices. Interprocedural transitive flow dependencies among a system dependence graph's linkage vertices are determined from the linkage grammar using a standard attribute-grammar construction: the computation of the subordinate characteristics graphs of the linkage grammar's nonterminals. In this section, we describe the construction of the linkage grammar and the computation of its subordinate characteristic graphs.

The context-free part of the linkage grammar models the system's procedure-call structure. The grammar includes one nonterminal and one production for each procedure in the system. If procedure F contains no calls, the right-hand sid3 of the production for P is $\epsilon$, otherwise, there is one right-hand-side nonterminal for each call site in P.

EXAMPLE

For the example system (shown in FIG. 4) the productions of the linkage grammar are as follows:

Main→A  A→Add Increment
Add→Increment→Add

Figure 5:
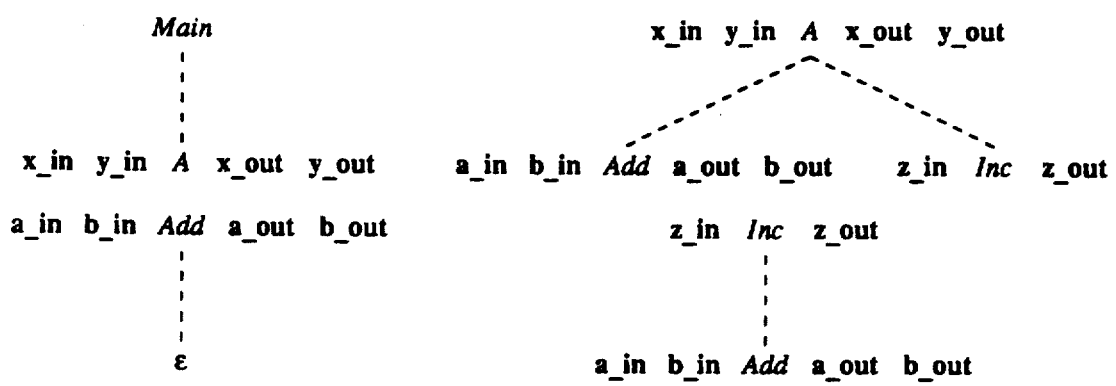
FIG. 5 is an example of the productions of the linkage grammar shown in tree form.
Figure 6:
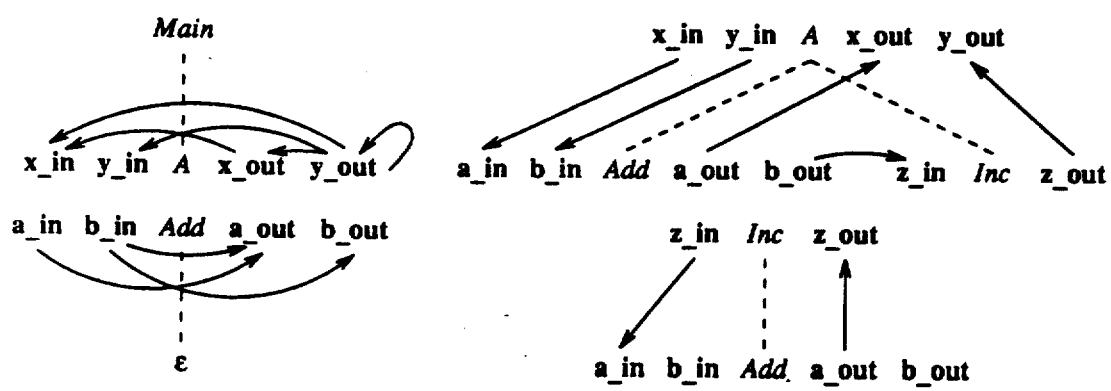
FIG. 6 is the productions of FIG. 5 augmented with attribute dependencies.

The attributes in the linkage grammar correspond to the parameters of the procedures. Procedure inputs are modeled as inherited attributes; procedure outputs are modeled as synthesized attributes. For example, the productions shown above are repeated in FIG. 5, this time in tree form. In FIG. 5, each nonterminal is annotated with its attributes; a nonterminal's inherited attributes are placed to its left; its synthesized attributes are placed to its right.

More formally, the program's linkage grammar has the following elements.

For each procedure P, the linkage grammar contains a nonterminal P.

For each procedure P, there is a production p: P→β, where for each site of a call on procedure Q in P there is a distinct occurrence of Q in β.

For each initialization vertex of P, there is an inherited attribute of nonterminal P.

For each finalization vertex of P, there is a synthesized attribute of nonterminal P.

Dependencies among the attributes of a linkage-grammar production are used to model the (possibly transitive) intraprocedural dependencies among the linkage vertices of the corresponding procedure. These dependencies are computed using (intraprocedural) slices of the procedure's procedure dependence graph. For each grammar production, attribute equations are introduced to represent the intraprocedural dependencies among the linkage vertices of the corresponding procedure dependence graph. For each attribute occurrence a, the procedure dependence graph is sliced with respect to the vertex that corresponds to a. An attribute equation is introduced for a so that a depends on the attribute occurrences that correspond to the linkage vertices identified by the slice. More formally:

For each attribute occurrence X.a of a production p, let v be the vertex of the procedure dependence graph $G_p$ that correspondes to X.a. Associate with p an attribute equation of the form X.a = $f(\ldots,Y.b,\ldots)$ where the arguments Y.b to the equation consist of the attribute occurrences of p that correspond to the linkage vertices in $G_p/v$.

(The actual function on the right-hand side of the equation is unimportant because the attribute grammar is never used for evaluation; all we are concerned about is that the equation represent the dependence described above). One property of the above definition is that the attribute dependency graph for each production is transitively closed.

It is entirely possible that a linkage grammar will be a circular attribute grammar (i.e., there may be attributes in some derivation tree of the grammar that depend on themselves). This does not create any difficulties as the linkage grammar is used only to compute transitive dependencies and not for attribute evaluation.

EXAMPLE

FIG. shows the productions of the grammar from FIG. 5, augmented with attribute dependencies. Note that there is an immediate cycle in the dependencies for the production Main→A.

Transitive dependencies from a call site's preprocessing vertices to its postprocessing vertices are computed from the linkage grammar by constructing the subordinate characteristic graphs for the grammar's nonterminals. The algorithm we give exploits the special structure of linkage grammars to compute these graphs more efficiently than can be done for attribute grammars in general. For general attribute grammars, computing the sets of possible subordinate characteristic graphs for the grammar's nonterminals may require time exponential in the number of attributes attached to some nonterminal. However, a linkage grammar is an attribute grammar of a restricted nature: For each nonterminal X in the linkage grammar, there is only one production with X on the left-hand side. Because linkage grammars are restricted in this fashion, for each nonterminal of a linkage grammar there is one subordinate characteristic graph that covers all of the nonterminal's other possible subordinate characteristic graphs. For such grammars, it is possible to give a polynomial-time algorithm for constructing the (covering) subordinate characteristic graphs.

The computation is performed by an algorithm that is a slight modification of an algorithm originally developed by Kastens to construct approximations to a grammar's transitive dependency relations. Kastens, U., "Ordered attribute grammars," Acta Inf. 13(3) pp. 229-256(1980). The covering subordinate characteristic graph of a nonterminal X of the linkage grammar is captured in the graph TDS(X) (standing for "Transitive Dependencies among a Symbol's attributes"). Initially, all the TDS graphs are empty. The construction that builds them up involves the auxiliary graph TDP(p) (standing for "Transitive Dependencies in a Production"), which expresses dependencies among the attributes of a production's nonterminal occurrences.

The basic operation used in ConstructSubCGraphs is the procedure "AddEdgeAndInduce(TDP(p),(a,b))", whose first argument is the TDP graph of some production p and whose second argument is a pair of attribute occurrences in p. AddEdgeAndInduce carries out three actions:

(1) The edge (a,b) is inserted into the graph TDP(p).

(2) Any additional edges needed to transitively close TDP(p) are inserted into TDP(p).

(3) In addition, for each edge added to TDP(p) by (1) or (2), (i.e., either the edge (a,b) itself or some other edge (c,d) added to reclose TDP(p)), AddEdgeAndInduce may add an edge to one of the TDS graphs. In particular, for each edge added to TDP(p) of the form $(X_o.m, X_o.n)$, where $X_o$ is the left-hand side occurrence of nonterminal X in product p and $(X.m, X.n) \notin TDS(X)$, an edge (X.m,X.n) is added to U 15 p and (X.m,X.n) TDS(X).

An edge in one of the TDS(X) graphs can be marked or unmarked; the edges that AddEdgeAndInduce adds to the TDS(X) graphs are unmarked.

The TDS graphs are generated by the procedure ConstructSubCGraphs, given in FIG. 7, which is a slight modification of the first two steps of Kastens' algorithms for constructing a set of evaluation plans for an attribute grammar. See Kastens, supra. ConstructSubGraphs performs a kind of closure operation on the TDP and TDS graphs. Step 1 of the algorithm—the first two for-loops of ConstructSubCGraphs—initializes the grammar's TDP and TDS graphs; when these loops terminate, the TDP graphs contain edges representing all direct dependencies that exist between the grammar's attribute occurrences. At the end of Step 1, TDP(p) is a (transitively closed) graph whose edges represent the direct dependencies of production p. The TDS graphs contain unmarked edges corresponding to direct left-hand side-to-left-hand-side dependencies in the linkage grammar's productions.

In Step 2 of ConstructSubCGraphs, the invariant for the while-loop is:

If a graph TDP(p) contains an edge e' that corresponds to a marked edge e in one of the TDS graphs, then e has been induced in all of the other graphs TDP(q). When all edges in all TDS graphs have received marks, the effects of all direct dependencies have been induced in the TDP and TDS graphs. Thus, the TDS(X) graphs computed by ConstructSubCGraphs are guaranteed to cover the actual transitive dependencies among the attributes of X that exist at any occurrence of X in any derivation tree.

Put more simply, because for each nonterminal X in a linkage grammar there is only a single production that has X on the left-hand side, the grammar only derives one tree. (For a recursive grammar it will be an infinite tree.) All marked edges in TDS represent transitive dependencies in this tree, and thus the TDS(X) graph computed by ConstructSubCGraphs represents a subordinate characteristic graph of X that covers the subordinate characteristic graph of any partial derivation tree derived from X, as desired.

Example. The nonterminals of our example grammar are shown below annotated with their attributes and their subordinate characteristic graphs.

x—in y—in A x—out y—out a—in b—in Add a—out b—out z—in Inc z—out

RECAP OF THE CONSTRUCTION OF THE SYSTEM DEPENDENCE GRAPH

Figure 17:
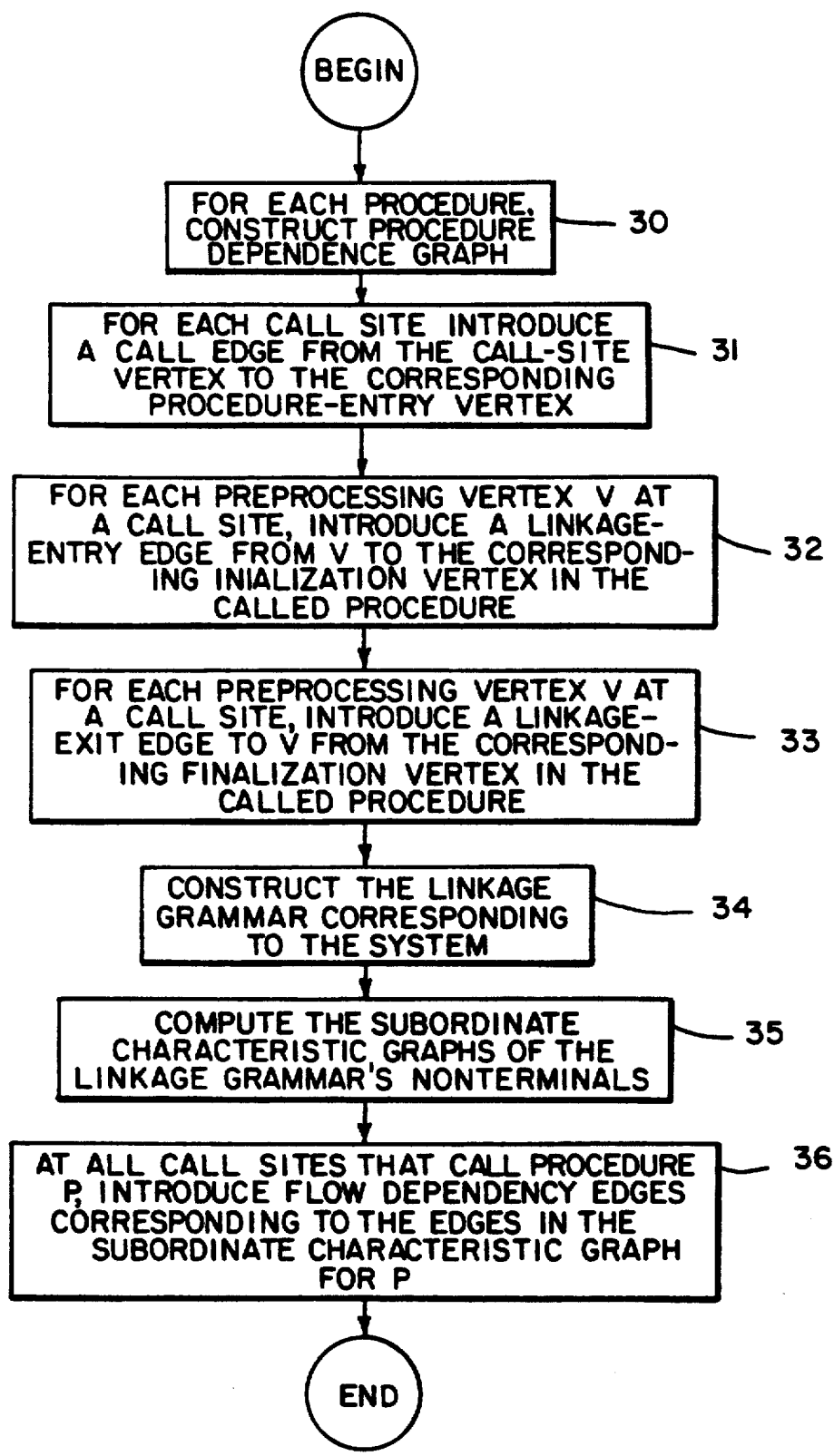
FIG. 17 is a flow diagram illustrating the steps carried out in constructing a system dependence graph.

The system dependence graph is constructed by the following step as illustrated in the flow chart of FIG. 17:

(1) For each procedure of the system, construct its procedure dependence graph at 30.

(2) For each call site, introduce a call edge from the call-site vertex to the corresponding procedure-entry vertex at 31.

(3) For each preprocessing vertex v at a call site, introduce a linkage-entry edge from v to the corresponding initialization vertex in the called procedure at 33.

(4) For each postprocessing vertex v at a call site, introduce a linkage-exit edge to v from the corresponding finalization vertex in the called procedure at 33.

(5) Construct the linkage grammar corresponding to the system at 34.

(6) Compute the subordinate character graphs of the linkage grammar's nonterminals at 35.

(7) At all call sites that call procedure P, introduce flow dependency edges corresponding to the edges in the subordinate characteristic graph

EXAMPLE

Figure 8:
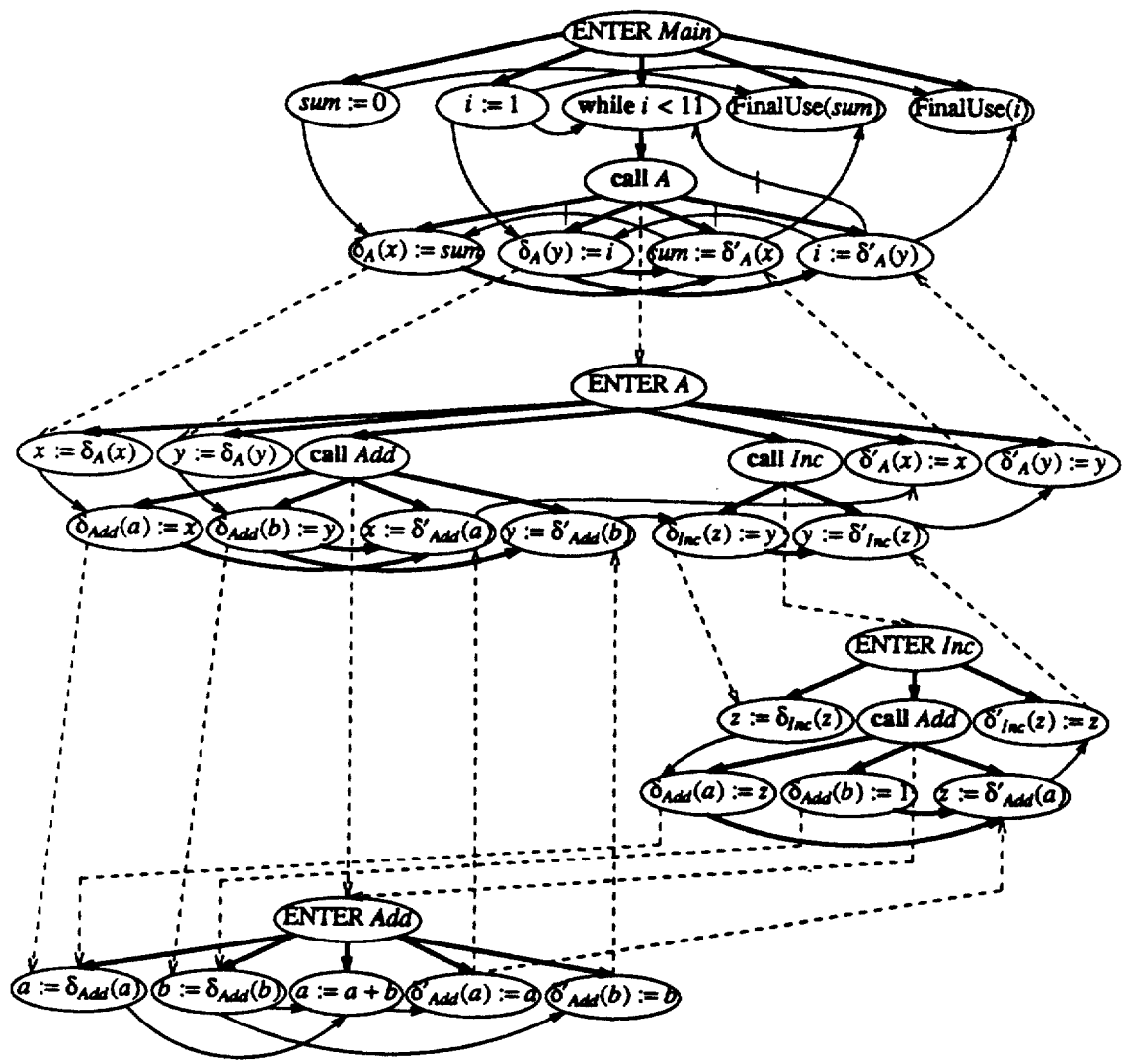
FIG. 8 is system dependence graph for an example system.

FIG. 8 shows the complete system dependence graphs for our example system. Control dependencies are represented using arcs; transitive interprocedural flow dependencies (corresponding to subordinate characteristic graph edges) are represented using heavy bold arcs; call edges, linkage-entry edges, and linkage-exit edges (the edges that connect program and procedure dependence graphs together) are represented using dashed arrows.

INTERPROCEDURAL SLICING

In the material below we describe how to perform an interprocedural slice using the system dependence graph defined above. We then discuss the modifications to the definition of the system dependence graph to permit more precise slicing and to extend the slicing algorithm's range of applicability.

AN ALGORITHM FOR INTERPROCEDURAL SLICING

As discussed above, the algorithm presented in Weiser, supra, while safe, is not as precise as possible The difficult aspect of interprocedural slicing is keeping track of the calling context when a slice "descends" into a called procedure.

The key element of our approach is the use of the linkage grammar's characteristic graph edges in the system dependence graph. These edges represent transitive data dependencies from preprocessing vertices to postprocessing vertices due to procedure calls. The presence of such edges permits us to sidestep the "calling context" problem; the slicing operation can move "across" a call without having to descend into it.

Our algorithm for interprocedural slicing is shown in FIG. 9. In FIG. 9, the computation of the slice of system dependence graph G with respect to vertex set S is performed in two phases. Both Phases 1 and 2 operate on the system dependence graph using essentially the method presented above for performing an intraprocedural slice — the graph is traversed to find the set of vertices that can reach a given set of vertices along certain kinds of edges. The traversal in Phase 1 follows flow edges, control edges, call edges, and linkage-entry edges, but does not follow def-order edges or linkage-exit edges. The traversal in Phase 2 follows flow edges, control edges, and linkage-exit edges, but does not follow call edges, def-order edges, or linkage-entry edges.

Figure 10:
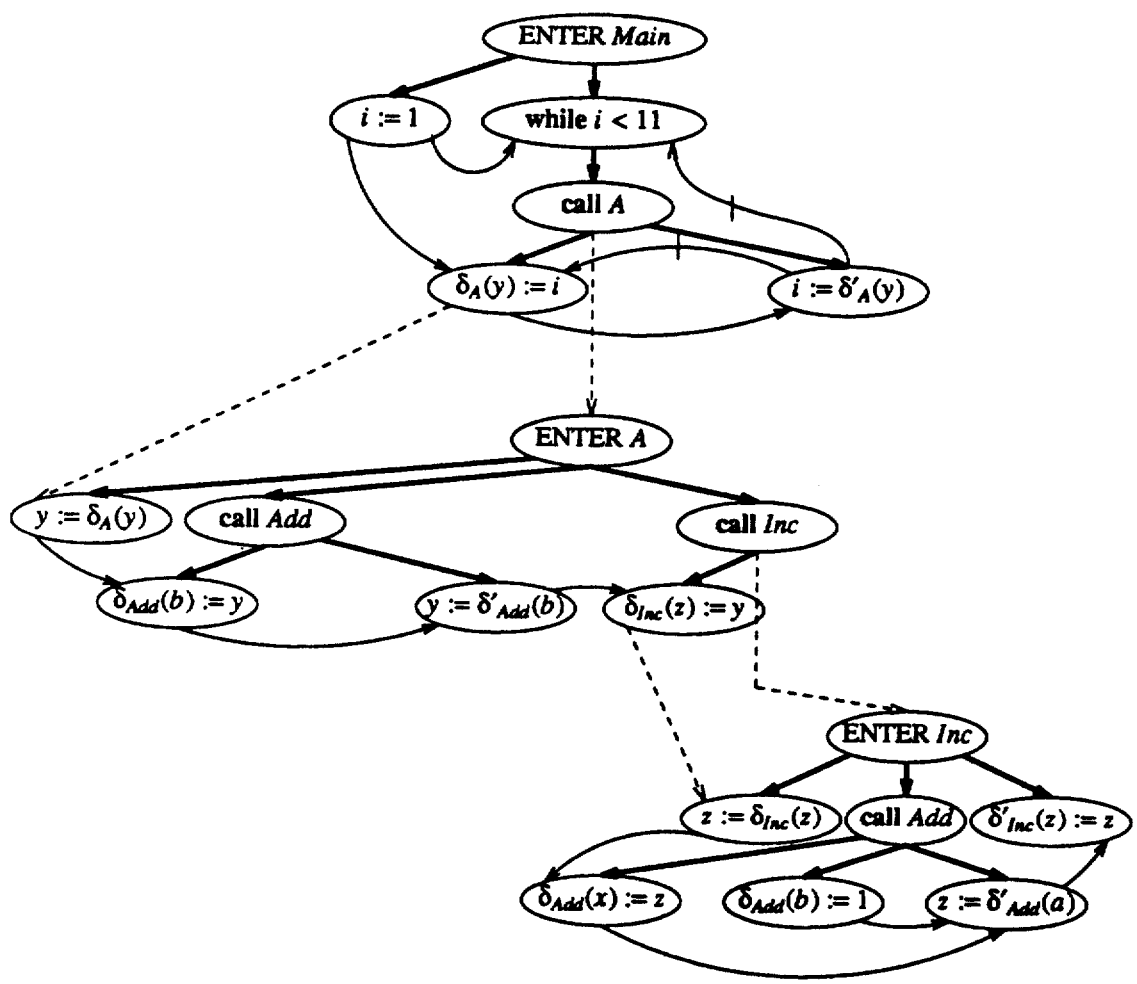
FIG. 10 is a system dependence graph for the example program which is sliced with respect to the finalization vertex for parameter x in procedure Increment.
Figure 11:
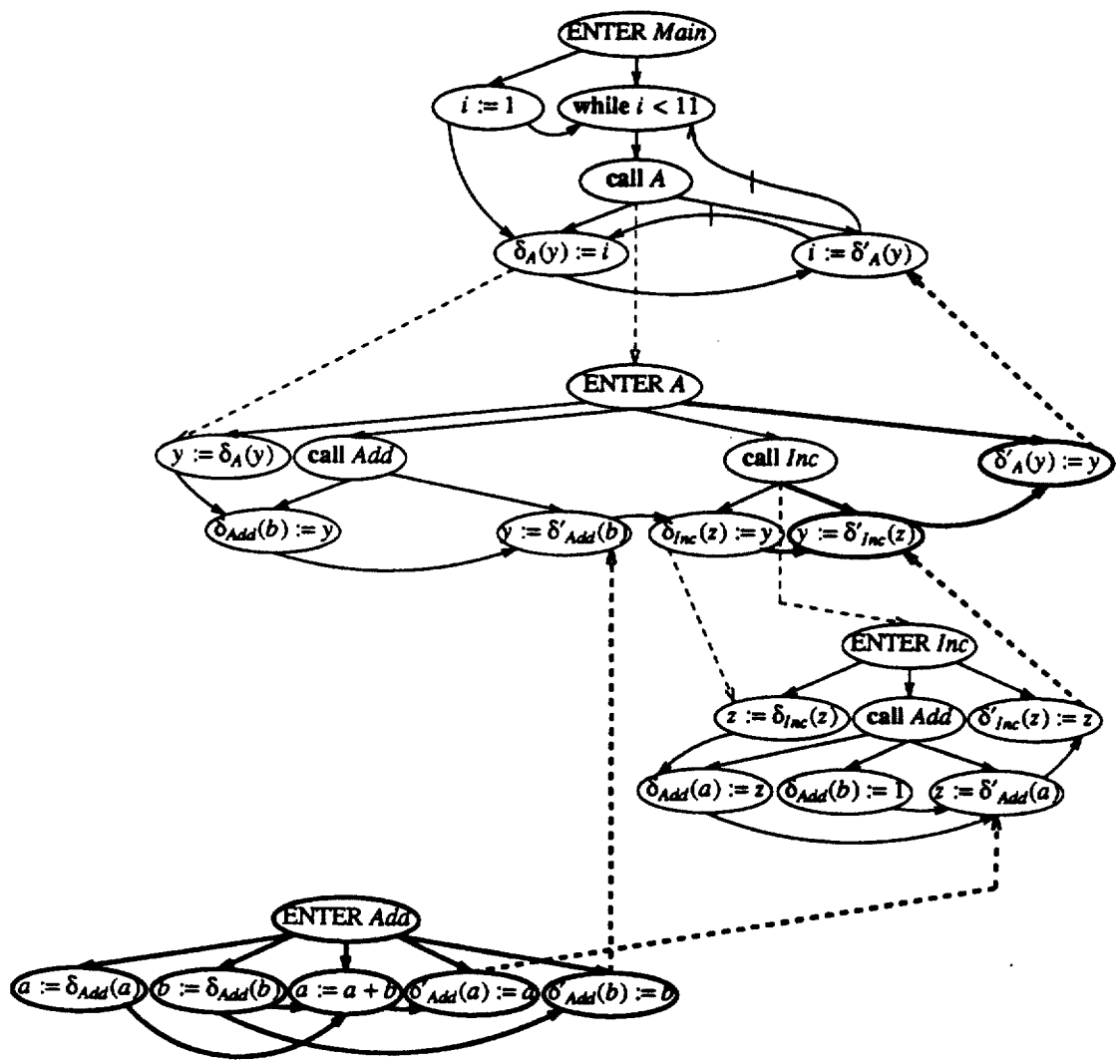
FIG. 11 is the system dependence graph for the example program of FIG. 10 which is sliced with respect to the finalization vertex afor parameter z in procedure Increment.

FIGS. 10 and 11 illustrate the two phases of the interprocedural slicing algorithm. FIG. 10 shows the vertices of the example system dependence graph that are marked during Phase 1 of the interprocedural slicing algorithm when the system is sliced with respect to the finalization vertex for parameter z in procedure Increment. Edges "traversed" during Phase 1 are also included in FIG. 10. FIG. 11 adds (in boldface) the vertices that are marked and the edges that are traversed during Phase 2 of the slice.

Figure 12:
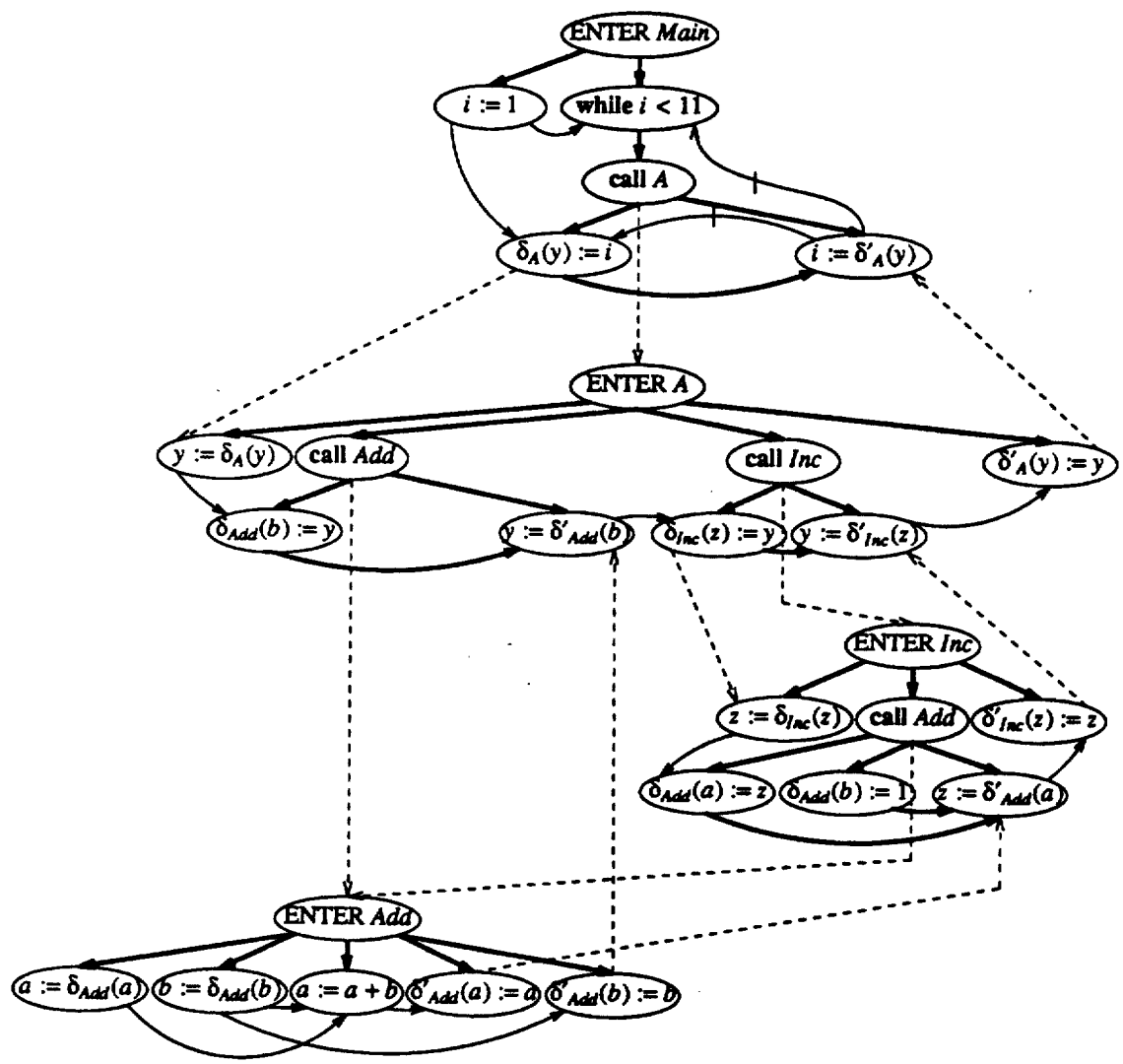
FIG. 12 is the complete slice of the example program's system dependence graph sliced with respect to the finalization for parameter z in procedure Increment.

The result of an interprocedural slice consists of the sets of vertices identified by Phase 1 and Phase 2, and the set of edges induce by this vertex set. FIG. 12 shows the completed example slice.

Given the goal of slicing system dependence graph G with respect to vertex s in procedure P, Phases 1 and 2 can be characterized as follows:

PHASE 1

Phase 1 identifies vertices that can reach s, and that are either in P itself or in a procedure that calls P. The effects of procedures called by P are not entirely ignored; the presence of flow dependence edges from preprocessing to postprocessing vertices (subordinate characteristic graph edges) permits the discovery of vertices that can reach s only through a procedure call, although the graph traversal does not actually "descend" into the called procedure.

PHASE 2

Phase 2 identifies vertices that can reach s from procedures called by P or from procedures called by procedures that call P.

USING INTERPROCEDURAL SUMMARY INFORMATION TO BUILD PROCEDURE DEPENDENCE GRAPHS

The slice shown in FIG. 12 illustrates a shortcoming of the method for constructing procedure dependence graphs described above. The problem is that including both a pre- and a post-processing vertex for every argument in a procedure call can affect the precision of an interprocedural slice. The slice shown in FIG. 12 includes the call vertex that represents the call to Add from A; however, this call does not affect the value of z in Increment. The problem is that a postprocessing vertex for argument y in the call to Add from A is included in A's procedure dependence graph even though Add does not change the value of y.

To achieve a more precise interprocedural slice we must use the results of interprocedural data flow analysis when constructing Procedure dependence graphs in order to exclude vertices like the postprocessing vertex for argument y.

The appropriate interprocedural summary information consists of the following sets, which are computed for each procedure P. See, Banning, J.P., "An efficient way to find the side effects of procedure calls and the aliases of variables," pp. 29-41 in Conference Record of the Sixth ACM Symposium on Principles of Programming Languages, (San Antonio, Tx, Jan. 29-31, 1979), ACM, New York, NY (1979].

GMOD(P)

the set of variables that might be modified by P itself or by a procedure (transitively) called from P.

GREF(P):

the set of variables that might be referenced by P itself or by a procedure (transitively) called from P.

GMOD and GREF sets are used to determine which linkage vertices are included in procedure dependence graphs as follows: For each procedure P, the linkage vertices subordinate to P's entry vertex include one initialization vertex for each variable in GMOD(P) ∪ GREF(P), and one finalization vertex for each variable in GMOD(P). Similarly, for each site at which P is called, the linkage vertices subordinate to the call-site vertex include one preprocessing vertex for each variable in GMOD(P) ∪ GREF(P), and one postprocessing vertex for each variable in GMOD(P). (It is necessary to include a preprocessing and an initialization vertex for a variable x that is in GMOD(P) and is not in GREF(P) because there may be an execution path through P on which x is not modified. In this case, a slice of P with respect to the final value of x must include the initial value of x; thus, there must be an initialization vertex for x in P, and a corresponding preprocessing vertex at the call to P.)

EXAMPLE

The GMOD and GREF sets for our example system are:

| procedure | GMOD | GREF |
|---|---|---|
| A | x,y | x,y |
| Add | a | a,b |
| Inc | z | z |

Because parameter b is not in GMOD(Add), Add's procedure dependence graph should not include a finalization vertex for b, and the call to Add from A should not include the corresponding postprocessing vertex.

Figure 13:
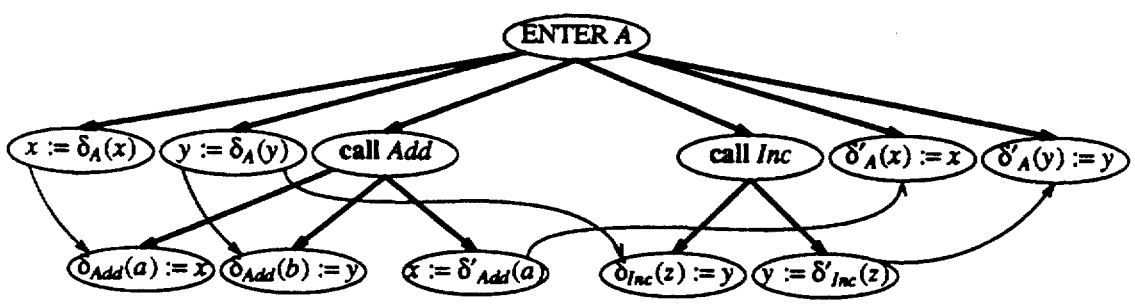
FIG. 13 is procedure A's procedure dependence graph built using inter procedural summary information.

FIG. 13 shows A's procedure dependence graph as it would be built using GMOD and GREF information. The postprocessing vertex for argument y of the call to Add is omitted, and the flow edge from that vertex to the preprocessing vertex "$\delta_{Inc}(z):=y$" is replaced by an edge from the initialization vertex "$y=\epsilon_A(y)$" to "$\epsilon_{Inc}(z):=y$". The new edge is transversed during Phase 1 of the interprocedural slice instead of the (now omitted) flow edge from "$Y:=\epsilon'_{Add}(a)$" to "$\epsilon_{Inc}(z):=y$", thus (correctly) bypassing the call to Add in procedure A.

PROCEDURE AND SYSTEM DEPENDENCE GRAPHS IN THE PRESENCE OF ALIASING

The problem of interprocedural slicing in the presence of aliasing can be reduced to the problem of interprocedural slicing in the absence of aliasing at the expense of the time and space needed to convert the original program into one that is alias free. (These costs may, in the worst case, be exponential in the maximum number of non-local variables—globals and parameters—visible to a procedure.)

The conversion is performed by simulating the calling behavior of the program (using the usual activation-tree model of procedure calls (Banning, supra,))to discover, for each instance of a procedure call, exactly how variables are aliased at that instance. (Although a recursive program's activation tree is infinite, the number of different alias configurations is finite; thus, only a finite portion of the activation tree is needed to compute aliasing information). A new copy of the procedure (with a new procedure name) is created for each different alias configuration; the procedure names used at call sites are similarly adjusted Within each procedure, variables are renamed so that each set of aliased variables is replaced by a single variable This process may generate multiple copies of a vertex v with respect to which we are to perform a slice. If this happens, it is necessary to slice the transformed program with respect to all occurrences of v.

EXAMPLE

Consider the following program in which aliasing occurs:

| program Main | procedure P(x) |
|---|---|
| global var a,b,c | x: = 0; |
| b: = 0; | a: = x + b; |
| call P(b); | call P(c) |
| call P(a) | return |
| end | |

Figure 14:
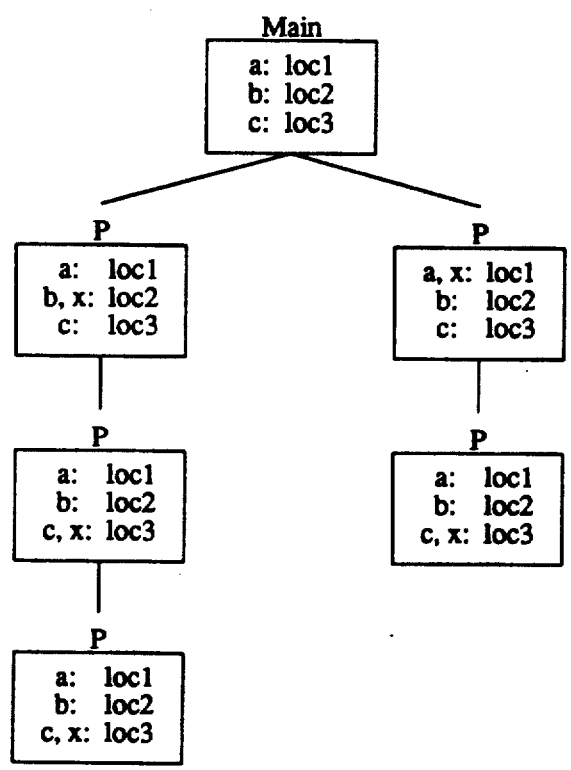
FIG. 14 is a program with aliasing and the portion of its activation tree needed to compute all alias configurations.

FIG. 14 shows the portion of this program's activation tree that is used to compute alias information for each call instance. We use the notation of Banning, supra, in which each node of the activation tree is labeled with the mapping from variable names to storage locations. The transformed, alias-free version of the program is shown below:

| program Main | procedure P1(bx) | procedure P2(cx) |
|---|---|---|
| global var a,b,c | bx :=0; | cx :=0; |
| b :=0; | a :=bx + bx; | a :=cx + b; |
| call P1(b); | call P2(c) | call P2(cx) |
| call P3(a) | return | return |
| end | | | procedure P3(ax)
    ax := 0;
    ax := ax + b;
    call P2(c)
return

If our original goal had been to slice with respect to the statement "a := x + b" in procedure P, we must now slice with respect to the set of statements: ["a := bx + bx", "a := cx + b", "ax := ax + b].

SLICING PARTIAL SYSTEM DEPENDENCE GRAPHS

The interprocedural slicing algorithm presented above is designed to be applied to a complete system dependence graph. In this section we discuss how to slice incomplete system dependence graphs.

The need to handle incomplete systems arises, for example, when slicing a program that calls a library procedure that is not itself available, or when slicing programs under development. In the first case, the missing components are procedures that are called by the incomplete system; in the second case, the missing components can either be not-yet-written procedures called by the incomplete system (when the program is developed top-down), or possible calling contexts (when the program is developed bottom-up).

In either case, information about the possible effects of missing calls and missing calling contexts is needed to permit slicing. This information takes the form of (safe approximations to) the subordinate characteristic graphs for missing called procedures and the superior characteristic graphs (See, Reps, T.W., *Generating Language-Based Environments* The M.I.T. Press (1984)) for missing calling contexts.

When no information about missing program components is available, subordinate characteristic graphs in which there is an edge from each inherited attribute to each synthesized attribute, and superior characteristic graphs in which there is an edge from each synthesized attribute to each other attribute (including itself), must be used. This is because the slice of the incomplete system should include all vertices that could be included in the slice of some "completed" system, and it is always possible to provide a call or a calling context that corresponds to the graphs described above.

For library procedures, it is possible to provide precise subordinate characteristic graphs even when the procedures themselves are not provided For programs under development, it might be possible to compute characteristic graphs, or at least better approximations to them than the worst-case graphs, given specifications for the missing program components.

VARIATIONS ON THE INTERPROCEDURAL SLICING METHOD

A number of additional algorithms that are based on the concepts and techniques developed for the interprocedural slicing method can also be defined. Below we describe four such algorithms. In all of then, the key element is the use of the linkage grammar's characteristic graph edges in the system dependence graph to represent transitive dependences, due to procedure calls, from preprocessing vertices to postprocessing vertices.

INTERPROCEDURAL SLICING RELATIVE TO A SINGLE PROCEDURE

The information computed by each phase of the interprocedural slicing algorithm can be useful on its own. For example, for each vertex s εS', where s is a vertex of some procedure R, phase 2 identifies vertices that can affect s from procedures called by R. This is a kind of interprocedural slice "relative to a single procedure.

An algorithm for interprocedural slicing with respect to a single vertex v, where the slice is taken relative to the procedure /containing v, is given in Table 5 below.

earlier for (backward) interprocedural slicing. An algorithm for forward interprocedural slicing is given as procedure MarkVerticesofForwardSlice in Table In Table the computation of the forward slice of system dependence graph G with respect to vertex set S is performed in two phases. The traversal in Phase 1 follows flow edges, control edges, and linkage-exit edges, but does not follow call edges, def-order edges, or linkage-entry edges. The traversal in Phase 2 follows flow edges, control edges, call edges, and linkage-entry edges, but does not follow def-order edges or linkage-exit edges.

TABLE 6

```
procedure MarkVerticesOfForwardSlice(G,S)
declare
    G: a system dependence graph
    S,S': sets of vertices in G
begin
    /* Phase 1: Slice forward without descending into called procedures*/
        MarkVerticesReached(G,S, {def-order, linkage-entry, call})
    /* Phase 2: Slice forward into called procedures without ascending to call sites*/
        S' := all marked vertices in G
        MarkVerticesReached(G,S', {def-order, linkage-exit})
end
procedure MarkVerticesReached(G,V,Kinds)
declare
    G: a system dependence graph
    V: a set of vertices in G
    Kinds: a set of kinds of edges
    v,w: vertices in V
    WorkList: a set of vertices in G
begin
    WorkList := V
    while WorkList ≠ ∅ do
        Select and remove a vertex v from WorkList
        Mark v
        for each unmarked vertex w that is a successor of v in G such that there is an edge v→w whose kind is not in Kinds do
            Insert w into WorkList
        od
    od
end
```

FORWARD SLICING RELATIVE TO A SINGLE PROCEDURE

TABLE 5

```
procedure MarkVerticesOfSlice(G,v)
delcare
    G: a system dependence graph
    v: a vertex of G
begin
    /* Slice called procedures without ascending to call sites*/
        MarkReachingVertices(G, {v}, {,def-order, linkage-entry, call})
end
procedure MarkReachingVertices(G,V,Kinds)
    [See FIG. 9.]
```

FORWARD SLICING

Whereas the slice of a program with respect to a program point p and variable x consists of all statements and predicates of the program that might affect the value of x at point p, the forward slice of a program with respect to a program point p and variable x consists of all statements and predicates Of the program that might be affected by the value of x at point p.

An algorithm for forward interprocedural slicing can be defined on system dependence graphs, using concepts and mechanisms that are similar to those defined As with the backward interprocedural slicing algorithm, the information computed by the individual phases of the forward interprocedural slicing algorithm can be useful on its own. For example, for each vertex sεS', where s is a vertex of some procedure R, Phase 1 identifies vertices that can be affected by s in procedures that call R. Again, tis is a kind of slice "relative to a single procedure."

An algorithm for forward interprocedural slicing with respect to a single vertex v, where the slice is taken relative to the procedure containing v, is given in Table below.

TABLE 7

```
procedure MarkVerticesOfForwardSlice(G,v)
declare
    G: a system dependence graph
```

TABLE 7-continued

```
v: a vertex of G
begin
    /* Slice forward without descending into called procedures*/
    MarkVerticesReached(G, {v}, {def-order, linkage-entry, call})
end
procedure MarkVerticesReached(G,V,Kinds)
[See Table 6]
```

FINDING DIRECTLY-AFFECTED POINTS

The system dependence graph can be used as a way of computing (an approximation to) the difference between two programs by finding directly affected points—places wherein the system dependence graphs of two programs are different. This operation would be employed, for example, in a semantics-based (as opposed to text-based) tool for integrating program versions. See, Horwitz, Prints and Reps, supra. The goal of such a tool is to combine several different but related variants of a base program automatically, determining when the variant programs incorporate interfering changes; this would be applied, for example, when a number of collaborators are collectively producing updates in a large programming project.

The integration capabilities of tools based on previous work are severally limited; in particular, previous work does not handle languages with procedure calls. For example, the tool described in Horwitz, Prins, and Reps, Supra, can only handle programs written in a simple language in which expression contain scalar variables and constants, and the only statements are assignment statements, conditional statements, and while-loops.

When an integration system compares two or more system dependence graphs generated from different versions of a program, it needs a way to identify vertices that correspond in the different graphs. One simplification is to assume that the system is supplied "tags" on SDG vertices that provide a means for identifying corresponding SDG vertices The tags are used to determine "identical" vertices when operations are performed on vertices from different SDGs (e.g., testing whether vertex v is a member of two vertex sets: $v \epsilon V(G) \wedge v \epsilon V(G')$).

It is possible to meet this requirement by requiring all users to make use of a specialized program editor with the properties listed below. (This editor would be employed, for example, when a user creates a variant program A from a copy of the base program Base.)

(1) The editor provides an automatic capability so that common components (i.e., statements and predicates) can be identified in all versions Each component's tag is guaranteed to persist across different editing sessions and machines; tags are allocated by a single server, so that two different editors cannot allocate the same new tag.

(2) The operations on program components supported by the editor are insert, delete, and move. When editing a copy of Base to create a variant, a newly inserted component is given a previously unused tag; the tag of a component that is deleted is never reused; a component that is moved from its original position in Base to a new position in the variant retains its tag from Base.

A tagging facility meeting these requirements can be supported by language-based editors, such as those that can be creates by such systems as MENTOR Donzeau-Gouge, V., Huet, G , Kahn, G., and Lang, B., "Programming environments based on structured editors The MENTOR experience," pp. 128-140 in Interactive Programming Environments, ed. D. Barstow, E. Sandewall, and H. Shrobe, McGraw-Hill, New York, NY (1984), GANDALFHabermann, A.N. and Notkin, D., "Gandalf Software development environments," IEEE Transactions on Software Engineering SE-12(12) pp. 1117-1127 (December 1986); Notkin, D., Ellison, R.J., Staudt, B.J., Kaiser, G.E., Habermann, A.N., Ambriola, V., and Montanger, C., Special issue on the GANDLF project, Journal of Systems and Software 5(2)(May 1985), and the Synthesizer Generator, Reps, T. and Teitelbaum, T., "The Synthesizer Generator,"Proceedings of the ACM SIGSOFT/SIGPLAN Software Engineering Symposium on Practical Software Development Enviroments, (Pittsburgh, PA, Apr. 23-25, 1984), ACM SIGPLAN Notices19(5) pp. 42-48 (May 1984) Reps, T. and Teitelbaum, T., The Synthesizer Generator: A System for Constructing Language-Based Editors, Springer-Verla9, New York, Y (1988).

The set of directly affected points are computed by comparing the sets of edges incident on a vertex v in dependence graph G. The incident edges can be classified as follows:

```
IncidentControl(v,G) = {w→_c v | w→_c v ∈ E(G)}
IncidentFlow(v,G) = {w→_f v | w→_f v ∈ E(G)}
IncidentDefOrder(v,G) = {x→_do(v)y | x→_do(v)y ∈ E(G)}
IncidentLinkageExit(v,G) = {x→_exit v | x→_exit v ∈ E(G)}
```

(Analogous definitions can be given for sets Incident-LinkageEntry (v,G) and IncidentCall(v,G); however they are not needed for our purposes.) Note that a def-order edge $x \overline{do(v)} y$ can be thought of as a hyper-edge directed from x to y to v. It is in this sense that a def-order edge is incident on witness vertex v.

Given dependence graphs $G_M$ and $G_N$, the set $DAP_{M,N}$ of vertices of $G_M$ that directly affected with respect to $G_N$, consisting of all vertices of $G_M$ that have different incident-edges sets than the corresponding vertices of $G_N$, is found by computing the following set:

```
DAP_{M,N} = {v ∈ V(G_M) | IncidentControl(v,G_M) ≠ IncidentControl(v,G_N)
                V IncidentFlow(v,G_M) ≠ IncidentFlow(v,G_N)
                V IncidentDefOrder(v,G_M) ≠ IncidentDefOrder(v,G_N)
                V IncidentLinkageExit(v,G_M) ≠ IncidentLinkageExit(v,G_N)}.
```

Note that incident call edges and linkage-entry edges are ignored in this computation, but that transitive interprocedural flow dependences are taken into account because they are represented by flow edges of the system dependence graph—the flow edges introduced in step (7) of the SDG construction method, corresponding to the subordinate characteristic graph edges of the linkage grammar. The directly affected points may be determined in accordance with the procedure of Table 8 below.

TABLE 8

```
function DirectlyAffectedPoints(G',G) returns a set of vertices
declare
    G',G: system dependence graphs
    S: a set of vertices
    w,w',u: individual vertices
begin
    S := ∅
    for each vertex w in G' do
        if w is not in G then
            Insert w into S
        fi
        if the sets of flow edges, control edges, or linkage-exit edges incident on w in G'
            are different from the sets incident on w in G then
            Insert w into S
        fi
        for each def-order edge w'→_{do(u)}w that occurs in G' but not in G do
            Insert u into S
        end
    end
    return(S)
end
```

THE COMPLEXITY OF THE SLICING ALGORITHM

This section discusses the complexity of the interprocedural slicing algorithm presented above. In the absence of aliasing, the cost is polynomial in (various) parameters of the system. In the presence of aliasing, the costs increase by an exponential factor that reflects the number of aliasing patterns in the program The increased cost is due to the blow-up in program size that can occur when a program with aliasing is converted to one that is alias free. Below we assume that such conversion has already been accomplished; the measures of system size used below are those associated with the alias-free system.

COST OF CONSTRUCTING THE SYSTEM DEPENDENCE GRAPH

The cost of constructing the system dependence graph can be expressed in terms of the parameters given in the following tables:

| Parameters that measure the size of an individual procedure | |
|---|---|
| V | the largest number of predicates and assignments in a single procedure |
| E | the largest number of edges in a single procedure dependence graph |
| Params | the largest number of formal parameters in any procedure |
| Sites | the largest number of call sites in any procedure |
| Parameters that measure the size of the entire system | |
| P | the number of procedures in the system (= the number of productions in the linkage grammar) |
| Globals | the number of global variables in the system |
| TotalSites ≤ P · Sites | the total number of call sites in the system |

Interprocedural data flow analysis is used to compute summary information about side effects Flow-insensitive interprocedural summary information (e.g. GMOD and GREF) can be determined particularly efficiently. In particular, in the absence of nested scopes, GMOD and GREF can be determined in time $O(P^2 + P \cdot \text{TotalSites})$ steps by the algorithm described in Cooper, K.D. and Kennedy, K., "Interprocedural side-effect analysis in linear time," Proceedings of the ACM SIGPLAN 88 Conference on Programming Language Design and Implementation, (Atlanta, GA, June 22-24, 1988), ACM SIGPLAN Notices 23(7) pp. 57–66 (July 1988).

Intraprocedural data flow analysis is used to determine the data dependencies of procedure dependence graphs. For the structured language under consideration here, this analysis can be performed in a syntax-directed fashion (for example, using an attribute grammar.

This involves propagating sets of program points, where each set consists of program points in a single procedure. This computation has total cost $O(V^2)$.

The cost of constructing the linkage grammar and computing its subordinate characteristic graphs can be expressed in terms of the following parameters:

| Parameters that measure the size of the linkage grammar | |
|---|---|
| R = Sites + 1 | the largest number of nonterminal occurrences in a single production |
| G = P + TotalSites | the number of nonterminal occurrences in the linkage grammar |
| ≤ P · R | |
| = P · (Sites + 1) | |
| X = Globals + Params | the largest number of attributes of a single nonterminal |
| D ≤ R · X | the largest number of attribute occurrences in a single production |
| = (Sites + 1) · (Globals + Params) | |

To determine the dependencies among the attribute occurrences in each production, its corresponding Procedure is sliced with respect to the linkage vertices that correspond to the attribute occurrences of the production. The cost of each slice is linear in the size of the procedure dependence graph; that is, the cost is bounded by $O(V + E)$. Consequently, the total cost of constructing the linkage grammar is bounded by $O(G \cdot X \cdot (V \cdot E))$.

It remains for us to analyze the cost of computing the linkage grammar's subordinate characteristic graphs. Because there are at most $D^2$ edges in each TDP(p)

relation, the cost of AddEdgeAndInduce, which recloses a single TDP(p) relation, is $O(D^2)$ The cost of initializing the TDP relations with all direct dependencies in ConstructSubCGraphs is bounded $O(P \cdot D^2)$ In the inner loop of procedure ConstructSubCGraphs, the AddEdgeAndInduce step is executed once for each occurrence of nonterminal N. There are at most X2 edges in each graph TDS(N) and G nonterminal occurrences where an edge may be induced. No edge is induced more than once because of the marks on TDS edges; thus, the total cost of procedure ConstructSubCGraphs is bounded by $O(G \cdot X^2 \cdot D^2)$ See, Kastens, Supra.

SLICING COSTS

An interprocedural slice is performed by two traversals of the system dependence graph, starting from some initial set of vertices. The cost of each traversal is linear in the size of the system dependence graph, which is bounded by $O(P \cdot (V + E) + TotalSites \cdot X)$.

INCORPORATION OF PROGRAM SLICING IN A PROGRAMMING TOOL

This section illustrates how a programming tool could make use of program-slicing operations to provide information to a user of the tool. We will illustrate how such a tool could work by supposing that the user has invoked the tool on buffer demoBase, which contains a program to sum the integers from 1 to 10, as shown below:

| demoBase | |
|---|---|
| program Main<br>begin<br>  sum := 0;<br>  i := 1;<br>  while i < 11 do<br>    call A(sum, i)<br>  od<br>end | procedure A(x, y)<br>begin<br>  call Add(x, y);<br>  call Increment(y)<br>return |
| procedure Add(a, b)<br>begin<br>  a := a + b<br>return | procedure Increment(z)<br>begin<br>  [call Add(z, 1)]<br>return |

The highlighted region (indicated above by the box around statement call Add(z,1)) changes to indicate the extent of the current selection. The new selection is a list of statements that, for the moment, consists of the single statement call Add(z,1).

The user can now invoke the, slice command (by selecting it from a menu of commands) to display all program elements—statements or predicates—that can affect the values of variables defined or used within the current selection. The slice command changes the display to indicate which program elements can affect the value of variable Z at call Add(z,1). In the screen images shown below, elements of a slice are indicated by enclosing them in double angle brackets — <<and >>; obviously other mechanisms, including color, could be employed to make the elements of the slice stand out better from the rest of the program.

| demoBase | |
|---|---|
| program Main<br>begin<br>  sum := 0;<br>  <<i := 1>>;<br>  while <<i < 11>> do<br>    call <<A>>(sum, <<i>>)<br>  od<br>end | procedure <<A>>(x, <<y>>)<br>begin<br>  call Add(x, y);<br>  call <<Increment>>(<<y>>)<br>return |
| procedure <<Add>>(<<a>>, <<b>>)<br>begin<br>  <<a := a + b>><br>return | procedure <<Increment>>(<<z>>)<br>begin<br>  [call <<Add>>(<<z>>, <<1>>)]<br>return |

| demoBase | |
|---|---|
| program Main<br>begin<br>  sum := 0;<br>  i := 1;<br>  while i < 11 do<br>    call A(sum, i)<br>  od<br>end | procedure A(x, y)<br>begin<br>  call Add(x, y);<br>  call Increment(y)<br>return |
| procedure Add(a, b)<br>begin<br>  a := a + b<br>return | procedure Increment(z)<br>begin<br>  call Add(z, 1)<br>return |

The user can find out about what program elements can potentially affect a given statement or predicate by slicing the program. First, the user would make a selection, say statement call Add(z,1) in procedure Increment, by pointing the locator (indicated by €) at any of the characters of the desired statement and invoking the select command by clicking the left mouse button.

Note that this slice does not contain statement call Add(x,y) of procedure A, nor formal parameter x of procedure A, nor actual parameter sum of the call on procedure A in procedure Main, nor statement sum := 0 of We now introduce buffer demoA, which contains a version of the program in buffer demoBase. This program created by editing a copy of demoBase, is just like demoBase except for the additional statement at the end of procedure Main, amean := sum/(i−1), which computes the arithmetic means.

| demoA | |
|---|---|
| program Main<br>begin<br>  sum := 0;<br>  i := 1;<br>  while i < 11 do<br>    call A(sum, i)<br>  od<br>  amean := sum/ (i−1)<br>end | procedure A(x, y)<br>begin<br>  call Add(x, y);<br>  call Increment(y)<br>return |
| procedure Add(a, b)<br>begin<br>  a := a + b<br>return | procedure Increment(z)<br>begin<br>  call Add(z, 1)<br>return |

As an aside, note that if the program in buffer demoA had been changes to initialize variable i to 0 instead of 1 (and compute ameans by ameans := sum/i), the slice of demoA with respect to statement call Add(Z,l) would not have been the same as the lice of demoBase with respect to call Add(z,l). As shown below, the slice of this version of ObdemoA contains statement i := 0 of procedure Main.

| demoA | |
|---|---|
| program Main<br>begin<br>  sum := 0;<br>  <<i := 1>>;<br>  while <<i < 11>> do<br>    call <<A>>(sum, <<i>>)<br>  od<br>  amean := sum/(i−1)<br>end | procedure <<A>>(x, <<y>>)<br>begin<br>  call Add(x, y);<br>  call <<Increment>>(<<y>>)<br>return |
| procedure <<Add>>(<<a>>, <<b>>)<br>begin<br>  <<a := a + b>><br>return | procedure <<Increment>>(<<z>>)<br>begin<br>  <u>call <<Add>>(<<z>>, <<1>>)</u><br>return |

When the program in buffer demoA is sliced with respect to statement call Add(Z,l), the slice consists of the same components that appeared in the slice of the program in buffer demoBase, shown previously.

Now consider the slice shown below in which (the original version of) demoA has been sliced with respect to statement ameans := sum / (i−1).

| demoA | |
|---|---|
| program Main<br>begin<br>  <<sum := 0>>;<br>  <<i := 1>>;<br>  while <<i < 11>> do<br>    call <<A>>(>>sum>>, <<i>>)<br>  od<br>  <u><<amean := sum/ (i−1)>></u><br>end | procedure <<A>>(<<x>>, <<y>>)<br>begin<br>  call <<Add>>(<<x>>, <<y>>);<br>  call <<Increment>>(<<y>>)<br>return |
| procedure <<Add>>(<<a>>, <<b>>)<br>begin<br>  <<a := a + b>><br>return | procedure <<Increment>>(<<z>>)<br>begin<br>  call <<Add>>(<<z>>, <<1>>)<br>return |

This slice contains a larger collection of program components than the ones shown previously, indicating that more components can potentially affect the values of variables used in statement ameans:=sum / (i−1) than can potentially affect callAdd(z,l). For example, in procedure Main, the slice contains the additional elements ameans :=sum /, (i−1) (the point with respect to which the slice is taken), actual parameter sum of call A(sum, i) (because of the flow dependence from actual parameter sum of call A(sum, i) to ameans := sum /(i−1)). and sum := 0

(because of the flow dependence from sum := 0 to actual parameter sum of call A(sum, I)).

Finally, the user can find are potentially affected by a given statement or predicate by having the tool display the elements of a forward slice. For example, the screen image shown below indicates the elements of a forward slice of the program in buffer demoA taken with respect to statement sum := 0; the elements of the slice are indicated by enclosing them in double square brackets.

| demoA | |
|---|---|
| program Main<br>begin<br>  [[sum := 0]];<br>  i := 1;<br>  while i < 11 do<br>    call A([[sum]], i)<br>  od<br>  [[amean := sum/ (i−1)]]<br>end | procedure A([[x]], y)<br>begin<br>  call Add([[x]], y);<br>  call Increment(y)<br>return |
| procedure Add([[a]], b)<br>begin<br>  [[a := a + b]]<br>return | procedure Increment(z)<br>begin<br>  call Add(z, 1)<br>return |

It is understood that the invention is not confined to the particular embodiments set forth herein as illustrative, but embraces such modified forms thereof as come within the scope of the following claims.

What is claimed is:

1. A method carried out by a digital computer for constructing a system dependence graph for a computer program system having multiple procedures, comprising the steps of:
   (a) for each procedure of the system, constructing its procedure dependence graph;
   (b) for each call site in the program, introducing a call edge from the call-site vertex to the corresponding procedure entry vertex;
   (c) for each preprocessing vertex v at a call site, introducing a linkage—entry edge from v to the corresponding initialization vertex in the called procedure;
   (d) for each post processing vertex v at a call site, introducing a linkage-exit edge to v from the corresponding finalization vertex in the called procedure;
   (e) constructing the linkage grammar corresponding to the system;
   (f) computing subordinate characteristics graphs of the linkage grammar's nonterminals; and
   (g) at all call sites that call a procedure P, introducing flow dependency edges corresponding to the edges in the subordinate characteristic graph for P.

* * * * *

UNITED STATES PATENT AND TRADEMARK OFFICE
CERTIFICATE OF CORRECTION

PATENT NO. : 5,161,216

DATED : November 3, 1992

INVENTOR(S) : Thomas Reps, et al

It is certified that error appears in the above-identified patent and that said Letters Patent is hereby corrected as shown below:

On title page, item [57] Abstract, line 14, "slide" should read --slice--.

In column 2, line 42, after "FIG. 1 with" insert --respect to--.

In column 2, line 55, "mark vertices" should read --marks the vertices--.

Col. 2, line 58, "parameter x" should read --parameter z--.

In column 2, line 61, "afor" should be --for--.

In column 2, line 65, after "finalization" insert --vertex--.

In column 2, line 67, "inter procedural" should be --interprocedural--.

In column 4, line 3, "VERSION (1')" should read --VERSION (1)--.

UNITED STATES PATENT AND TRADEMARK OFFICE
CERTIFICATE OF CORRECTION

PATENT NO. : 5,161,216

DATED : November 3, 1992

INVENTOR(S) : Thomas Reps, et al

It is certified that error appears in the above-identified patent and that said Letters Patent is hereby corrected as shown below:

In column 5, line 43, "$v_1 \rightarrow c_2$" should be --$v_1 \rightarrow cV_2$--.

In column 5, line 56, "v1" should be --$v_1$--.

In column 6, line 24, "$v_1 \rightarrow lc(2)V_2$" should be
-- $v_1 \xrightarrow{lc(L)} V_2$ --.

In column 6, line 37, " $\xrightarrow{v_1 lc(1)^{v_2}}$ " should be
-- $v_1 \xrightarrow{lc(L)} V_2$ --.

In column 6, line 45, "$v_1 \rightarrow v_3$ and $v_2 \rightarrow v_3$" should be
--$v_1 \rightarrow fv_3$ and $v_2 \rightarrow fv_3$--

In column 7, line 13, " $\xrightarrow{wc,f^2}$ " should be
-- $\xrightarrow{wc,f^3}$ --.

In column 7, line 30, " $\xrightarrow{v_{so(\mu)} w}$ " should be
-- $v \xrightarrow{do(u)} w$ --.

In column 7, line 31, "$G,/S$" should be --$G/S$--.

UNITED STATES PATENT AND TRADEMARK OFFICE
CERTIFICATE OF CORRECTION

PATENT NO. : 5,161,216

DATED : November 3, 1992

INVENTOR(S) : Thomas Reps, et al

It is certified that error appears in the above-identified patent and that said Letters Patent is hereby corrected as shown below:

In column 7, line 31, after "vertex" insert --u--.

In column 7, lines 34 through 47,

"
$$E(G/S) = \left\{ \left(v \xrightarrow{\overline{f}} w\right) \mid \left(v \xrightarrow{\overline{f}} w\right) \epsilon E(G) \wedge v, w \epsilon V(G/S) \right\}$$
$$\cup \left\{ \left(v \xrightarrow{\overline{c}} w\right) \mid \left(v \xrightarrow{\overline{c}} w\right) \epsilon E(G) \wedge v, w \epsilon V(G/S) \right\}$$
$$\cup \left\{ \left(v \xrightarrow{\overline{do(U)}} w\right) \mid \left(v \xrightarrow{\overline{do(U)}} w\right) \epsilon E(G) \wedge u, w \epsilon V(G/S) \right\}$$
"

should be

--
$$E(G/S) = \left\{ \left(v \xrightarrow{\overline{f}} w\right) \mid \left(v \xrightarrow{\overline{f}} w\right) \epsilon E(G) \wedge v, w, \epsilon V(G/S) \right\}$$
$$\cup \left\{ \left(v \xrightarrow{\overline{c}} w\right) \mid \left(v \xrightarrow{\overline{c}} w\right) \epsilon E(G) \wedge v, w, \epsilon V(G/S) \right\}$$
$$\cup \left\{ \left(v \xrightarrow{\overline{do(U)}} w\right) \mid \left(v \xrightarrow{\overline{do(U)}} w\right) \epsilon E(G) \wedge u, v, \epsilon V(G/S) \right\}$$
--.

UNITED STATES PATENT AND TRADEMARK OFFICE
CERTIFICATE OF CORRECTION

PATENT NO. : 5,161,216
DATED : November 3, 1992
INVENTOR(S) : Thomas Reps, et al It is certified that error appears in the above-identified patent and that said Letters Patent is hereby corrected as shown below:

In column 7, line 55, "S≤V(G)," should be --S⊆V(G),--.

In column 9, line 48, after "[($V_i$, $V_i$+1)|i= 1,...,k - 1]" insert -- ⊆ --.

In column 9, line 49, after "vertices V'" insert -- ⊆ --.

In column 9, line 53, after "$v_k$-1" insert --⊄--.

In column 11, line 43, "silledVars" should be --killedVars--.

Column 11, line 58, of Table 3, after "∈S.reachingDefsBefore" insert --∧--.

Column 11, line 61, of Table 3, after "i" insert --⊄--.

Column 11, line 65, of Table 3, after "else $S_3$" insert --fi--.

UNITED STATES PATENT AND TRADEMARK OFFICE
CERTIFICATE OF CORRECTION

PATENT NO. : 5,161,216

DATED : November 3, 1992

INVENTOR(S) : Thomas Reps, et al

It is certified that error appears in the above-identified patent and that said Letters Patent is hereby corrected as shown below:

In column 12, line 49, "$S_2$ reachingDefsBefore" should be --$S_2$.reachingDefsBefore--.

In column 12, line 67, "q>∧$S_1$.reachingDefsBefore∈i}Exp.used}." should be --"q>∈$S_1$.reachingDefsBefore∧i∈}Exp.used}.--.

Column 13, line 27, of Table 4, after "∈S.reachingDefsBefore" insert --∧--.

Column 13, line 31, of Table 4, " i $S_3$.killedVars]" should be --∧ i⊄ $S_3$.killedVars]--.

Column 13, line 34, of Table 4, after "$S_2$ else $S_3$" insert --li--.

In column 13, line 52, "so follows:" should be --as follows:--.

In column 13, line 55, "S.reachingDefsAfter=<i,q,l>|<i,q,l>∈" should be --S.reachingDefsAfter={<i,q,l>|<i,q,l>∈--.

UNITED STATES PATENT AND TRADEMARK OFFICE
CERTIFICATE OF CORRECTION

PATENT NO. : 5,161,216

DATED : November 3, 1992

INVENTOR(S) : Thomas Reps, et al

It is certified that error appears in the above-identified patent and that said Letters Patent is hereby corrected as shown below:

In column 14, line 1, "FlowSources($S_l$)={q|<i,q,1>$S_l$." should be --"FlowSources($S_l$)={q|<i,q,1>$\epsilon S_l$.--.

In column 14, line 2, "reachingDefsBefore i$\epsilon$Exp.used}." should be --reachingDefsBefore $\wedge$i$\epsilon$Exp.used}.--.

In column 14, line 56, "having upper" should read --20 having--.

In column 16, line 56, "associates" should be --associated--.

In column 16, line 57, "cell" should be --call--.

In column 16, line 60, "cell-site" should be --call-site--.

In column 16, line 62, "parameters" should be --parameter--.

In column 16, line 63, "labeled$\epsilon_Q(r)$:=e," should be --labeled$\delta_Q(r)$:=e,--.

UNITED STATES PATENT AND TRADEMARK OFFICE
CERTIFICATE OF CORRECTION

PATENT NO. : 5,161,216
DATED : November 3, 1992
INVENTOR(S) : Thomas Reps, et al It is certified that error appears in the above-identified patent and that said Letters Patent is hereby corrected as shown below:

In column 16, line 67, "a $:=\epsilon'_Q(r)$" should be --a $:=\delta'_Q(r)$--.

In column 17, line 7, "r $:=\epsilon_Q(r)$, and $\epsilon_{Q'}(r) :=r$" should be --r $:=\delta_Q(r)$, and $\delta_{Q'}(r) :=r$--.

In column 17, line 42, "procedure F" should be --procedure P--.

In column 17, line 43, "sid3" should be --side--.

In column 17, line 52, "Add→Increment→Add" should be --Add→$\epsilon$Increment→Add--.

In column 18, line 43, after "FIG." insert --6--.

In column 19, line 37, delete "U 15 p and (X.m,X.n)".

In column 20, line 39, "33." should be --32.--.

In column 20, line 45, "character" should be --characteristic--.

UNITED STATES PATENT AND TRADEMARK OFFICE
CERTIFICATE OF CORRECTION

PATENT NO. : 5,161,216
DATED : November 3, 1992
INVENTOR(S) : Thomas Reps, et al It is certified that error appears in the above-identified patent and that said Letters Patent is hereby corrected as shown below:

In column 20, line 49, after "graph" insert --for P at 36.--.

In column 21, line 1, "ANALGORITHM" should be --AN ALGORITHM--.

In column 21, line 5, "possible" should be --possible.--.

In column 23, line 10, "y=$\epsilon_A(y)$" should be --y=$\delta_A(y)$--.

In column 23, line 11, "$\epsilon_{Inc}(z)$ :=y" should be --$\delta_{Inc}(z)$ :=y--.

In column 23, line 13, ""Y :=$\epsilon'_{Add}(a)$" to "$\epsilon_{Inc}(z)$" should be --"y := $\delta_{Add}(a)$" to "$\delta_{Inc}(z)$--.

In column 25, line 60, "Of" should be --of--.

In column 26, line 3, after "Table" insert --6.--.

UNITED STATES PATENT AND TRADEMARK OFFICE
CERTIFICATE OF CORRECTION

PATENT NO. : 5,161,216

DATED : November 3, 1992

INVENTOR(S) : Thomas Reps, et al

It is certified that error appears in the above-identified patent and that said Letters Patent is hereby corrected as shown below:

In column 26, line 4, after "Table" insert --6--.

In column 26, line 59, "tis" should be --this--.

In column 27, line 19, "Prints" should be --Prins--.

In column 27, line 27, "severally" should be --severely--.

In column 27, line 53, "versions" should be --versions. --.

In column 28, line 15, "creates" should be --created--.

In column 28, line 17, "editors" should be --editors:--.

In column 28, line 21, "GANDALFHabermann" should be --GANDALF; Habermann--.

In column 28, line 26, "GANDLF" should be --GANDALF--.

In column 28, line 33, "(May 1984)" should be --(May 1984);--.

UNITED STATES PATENT AND TRADEMARK OFFICE
CERTIFICATE OF CORRECTION

PATENT NO. : 5,161,216

DATED : November 3, 1992

INVENTOR(S) : Thomas Reps, et al

It is certified that error appears in the above-identified patent and that said Letters Patent is hereby corrected as shown below:

In column 28, line 36, "Springer-Verla9, New York, Y (1988)." should be --Springer-Verlag, New York, NY (1988).--.

In column 28, line 56, "incident-edges" should be --incident-edge--.

In column 29, line 35, "reflects he" should be --reflects the--.

In column 30, line 65, "X . (V E))." should be --X . (V+E)).--.

In column 31, line 2, "The cost of 5" should be --The cost of--.

In column 31, line 4, "$O(P . D^2)$" should be --$O(P . D^2)$.--.

In column 31, line 8, "X2" should be --$X^2$--.

In column 31, line 66, "(indicated by $\epsilon$)" should be --(indicated by $Q$)--.

UNITED STATES PATENT AND TRADEMARK OFFICE
CERTIFICATE OF CORRECTION

PATENT NO. : 5,161,216
DATED : November 3, 1992
INVENTOR(S) : Thomas Reps, et al It is certified that error appears in the above-identified patent and that said Letters Patent is hereby corrected as shown below:

In column 32, line 12 of the first boxed diagram, "call Add(z,1)" should be --call Add (z, $\emptyset$ )--.

In column 32, line 20, "invoke the, slice" should be --invoke the slice--.

In column 32, line 62, after "of" insert --procedure Main. --.

In column 32, line 67, "Mai$_n$" should be --Main--.

In column 34, line 3, "ameans by ameans" should be --amean by amean--

In column 34, line 4, "Add(Z,1)" should be --Add(z,1)--.

In column 34, line 5, "lice" should be --slice--.

In column 34, line 7, "ObdemoA" should be --of demoA--.

In column 34, line 3 of the first boxed diagram, "<<i:=1>>;" should be --<<i:=0>>;--.

UNITED STATES PATENT AND TRADEMARK OFFICE
CERTIFICATE OF CORRECTION

PATENT NO. : 5,161,216
DATED : November 3, 1992
INVENTOR(S) : Thomas Reps, et al It is certified that error appears in the above-identified patent and that said Letters Patent is hereby corrected as shown below:

```
In column 34, line 27, "ameans" should be --amean--.

In column 34, line 7 of the second boxed diagram, "call
    <<A>>(>>sum>>,<<i>>)" should be --call
    <<A>>(<<sum>>,<<i>>)--.

In column 34, line 47, "ameans" should be --amean--.

In column 34, line 50, "ameans" should be --amean--.

In column 35, line 1, "ameans" should be --amean--.
```

Signed and Sealed this

Fifth Day of July, 1994

Attest:

BRUCE LEHMAN

*Attesting Officer*   Commissioner of Patents and Trademarks